United States Patent
Moon et al.

(10) Patent No.: US 10,848,686 B2
(45) Date of Patent: Nov. 24, 2020

(54) METHOD OF PROVIDING IMAGE AND ELECTRONIC DEVICE FOR SUPPORTING THE METHOD

(71) Applicant: SAMSUNG ELECTRONICS CO., LTD., Suwon-si (KR)

(72) Inventors: Sung-Hwan Moon, Suwon-si (KR); Dae-Yun Park, Suwon-si (KR); Sung-Ju Huh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

(21) Appl. No.: 16/211,460

(22) Filed: Dec. 6, 2018

(65) Prior Publication Data
US 2019/0182434 A1 Jun. 13, 2019

(30) Foreign Application Priority Data
Dec. 7, 2017 (KR) .................. 10-2017-0167369

(51) Int. Cl.
*H04N 5/232* (2006.01)
*H04N 5/262* (2006.01)
*G06T 3/00* (2006.01)
*H04N 5/357* (2011.01)

(52) U.S. Cl.
CPC ......... *H04N 5/2625* (2013.01); *G06T 3/0068* (2013.01); *H04N 5/23229* (2013.01); *H04N 5/23258* (2013.01); *H04N 5/23267* (2013.01); *H04N 5/23287* (2013.01); *H04N 5/23293* (2013.01); *H04N 5/357* (2013.01)

(58) Field of Classification Search
None
See application file for complete search history.

(56) References Cited

U.S. PATENT DOCUMENTS

| 6,487,323 B1 | 11/2002 | Bonnet et al. |
| 7,085,409 B2 | 8/2006 | Sawhney et al. |
| 8,649,660 B2 | 2/2014 | Bonarrigo et al. |

(Continued)

FOREIGN PATENT DOCUMENTS

| JP | 2002-522983 A | 7/2002 |
| JP | 4533266 B2 | 9/2010 |

(Continued)

*Primary Examiner* — Twyler L Haskins
*Assistant Examiner* — Wesley J Chiu
(74) *Attorney, Agent, or Firm* — Volentine, Whitt & Francos, PLLC

(57) ABSTRACT

An electronic device includes a camera, a memory, and a processor. The processor is configured to: (1) obtain a plurality of images having a first attribute with respect to an external object, by using the camera, (2) generate at least one first image by correcting images included in a first image set from among the plurality of images, during at least a portion of the obtaining of the plurality of images, (3) display the generated at least one first image, (4) obtain a plurality of images having a second attribute with respect to the external object, based on a received signal corresponding to an image capture of the external object, during the at least portion of obtaining the plurality of images, and (5) store at least one second image generated by correcting the plurality of images having the second attribute based on the first image set.

12 Claims, 12 Drawing Sheets

(56) References Cited

U.S. PATENT DOCUMENTS

| | | | |
|---|---|---|---|
| 9,282,253 B2 | 3/2016 | Amitay et al. | |
| 2009/0115860 A1* | 5/2009 | Nakashima | H04N 5/23248 348/208.99 |
| 2012/0002082 A1* | 1/2012 | Johnson | G06T 5/50 348/234 |
| 2015/0054985 A1* | 2/2015 | Baek | H04N 5/23293 348/231.99 |
| 2016/0037046 A1* | 2/2016 | Nashizawa | H04N 5/2355 348/229.1 |
| 2016/0205291 A1* | 7/2016 | Narahari | H04N 5/211 348/208.1 |
| 2016/0227092 A1* | 8/2016 | Ikeda | H04N 5/35581 |

FOREIGN PATENT DOCUMENTS

| | | |
|---|---|---|
| JP | 2016-128946 A | 7/2016 |
| KR | 10-1588031 B1 | 2/2016 |
| WO | WO2017-171248 A1 | 10/2017 |

* cited by examiner

FIG. 12

| IMAGE PROCESSING TIME OF RELATED ART | 265mesc |
|---|---|
| IMAGE PROCESSING TIME OF INVENTIVE CONCEPT | 210mesc |

METHOD OF PROVIDING IMAGE AND ELECTRONIC DEVICE FOR SUPPORTING THE METHOD

CROSS-REFERENCE TO RELATED APPLICATION

This application claims the benefit of Korean Patent Application No. 10-2017-0167369, filed on Dec. 7, 2017, in the Korean Intellectual Property Office, the disclosure of which is incorporated herein in its entirety by reference.

BACKGROUND

The disclosure relates to a method of providing an image and an electronic device for supporting the method.

With development of information communication technologies and semiconductor technologies, distribution and use of various electronic devices have been rapidly increased. Along with the wide distribution of electronic devices, the electronic devices are configured to support various functions, such as a function of a camera, etc.

The electronic devices are capable of generating a high-quality image by applying various image processing algorithms with respect to an image obtained by a camera. While generating a moving image based on the image obtained by the camera, the electronic devices are capable of generating a still image with respect to an external object based on a user input.

SUMMARY

When related-art electronic devices generate a still image while generating a moving image, information generated in the operation of generating the moving image is not used by the electronic devices for the operation of generating the still image, and thus, excessive computations have to be performed to perform the operation of generating the moving image and the operation of generating the still image. Accordingly, since the electronic devices perform the excessive computations for image processing, heating, increases in power consumption and computational time, etc., may occur.

The disclosure provides a method of providing an image, whereby a still image is generated by using information calculated while a moving image is generated, and an electronic device for supporting the method.

According to an aspect of the disclosure, there is provided an electronic device including a camera, a memory, and a processor, wherein the processor is configured to obtain a plurality of images having a first attribute with respect to an external object, by using the camera, generate at least one first image by correcting images included in a first image set from among the plurality of images, during at least a portion of the obtaining of the plurality of images, display the generated at least one first image, obtain a plurality of images having a second attribute with respect to the external object, based on a signal received, the signal corresponding to an image capture about the external object, during the at least the portion of the obtaining of the plurality of images, and store at least one second image generated by correcting the plurality of images having the second attribute based on the first image set.

According to another aspect of the disclosure, there is provided a method of providing an image, the method including obtaining a plurality of images having a first attribute with respect to an external object, by using a camera, generating at least one first image by correcting images included in a first image set from among the plurality of images, during at least a portion of the obtaining of the plurality of images, displaying the generated at least one first image, obtaining a plurality of images having a second attribute with respect to the external object, based on a signal received, the signal corresponding to an image capture about the external object, during the at least the portion of the obtaining of the plurality of images, and storing at least one second image generated by correcting the plurality of images having the second attribute based on the first image set.

BRIEF DESCRIPTION OF THE DRAWINGS

Embodiments of the disclosure will be more clearly understood from the following detailed description taken in conjunction with the accompanying drawings in which:

FIG. 12 is a view for describing an effect of a method of providing an image, according to embodiments.

DETAILED DESCRIPTION OF THE EMBODIMENTS

Figure 1:
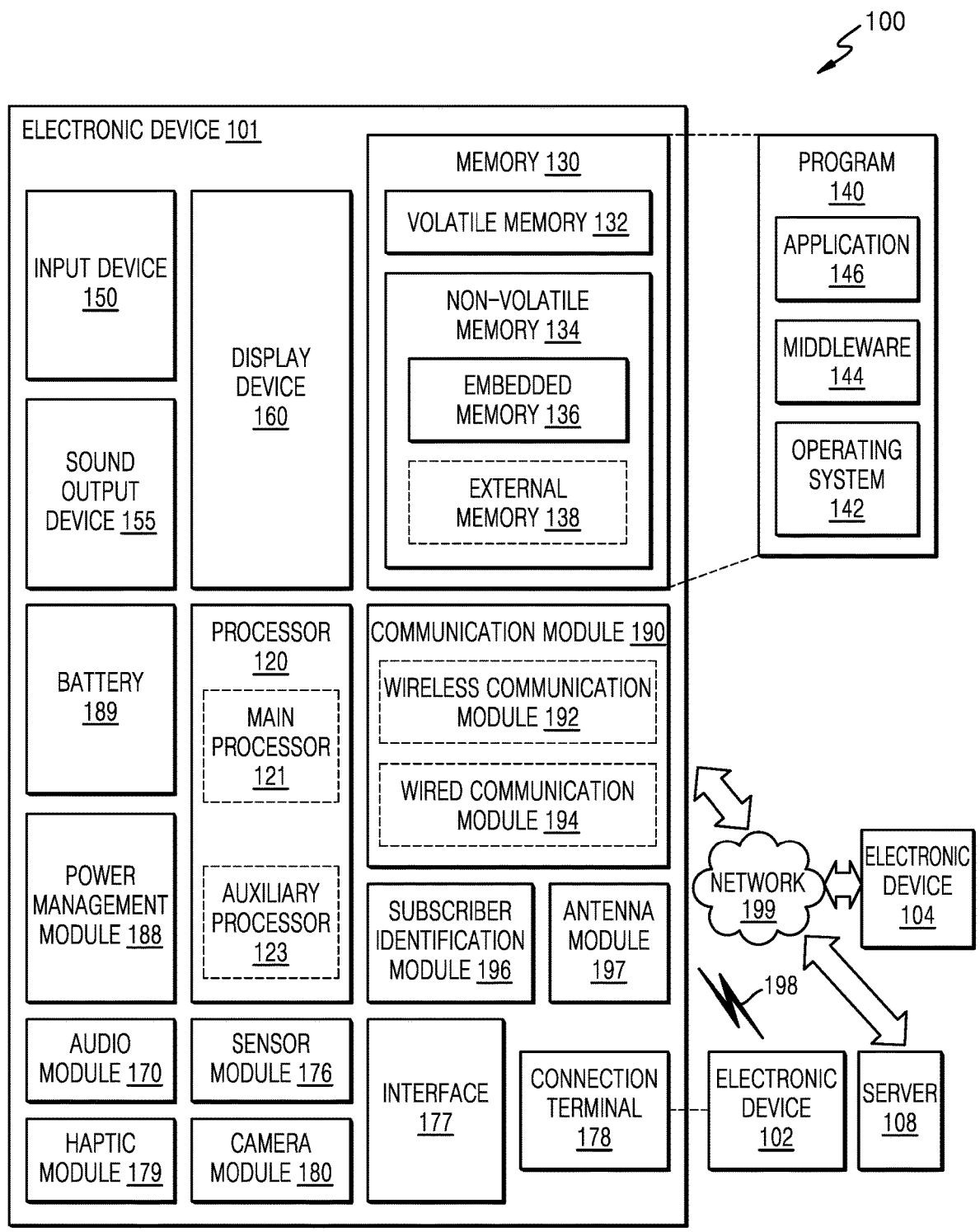
FIG. 1 is a block diagram of an electronic device in a network environment, according to embodiments.

FIG. 1 is a block diagram of an electronic device 101 in a network environment 100, according to embodiments. Referring to FIG. 1, the electronic device 101 in the network environment 100 may communicate with an electronic device 102 via a network 198 (for example, short range wireless communication) or may communicate with an electronic device 104 or a server 108 via a second network 199 (for example, long range wireless communication). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, the electronic device 101 may omit at least one (for example, the display device 160 or the camera module 180) of these components or further add another component. In some embodiments, for example, as in the case of the sensor module 176 (for example, a fingerprint sensor, an iris sensor, or an illuminance sensor) embedded in the display device 160 (for example, a display), one or more components may be integrated.

The processor 120 may, for example, drive software (for example, a program 140) to control at least another component (for example, a software or hardware component) of the electronic device 101 connected to the processor 120 and may perform various data processing and computation. The processor 120 may load commands or data received from other components (e.g., the sensor module 176 or the communication module 190) to a volatile memory 132 and process the loaded commands or data. Also, the processor 120 may store result data in a nonvolatile memory 134. According to an embodiment, the processor 120 may include a main processor 121 (for example, a central processing device or an application processor), and an auxiliary processor 123 (e.g., a graphics processing device, an image signal processor, a sensor hub processor, or a communication processor) operated separately from the main processor 121 and additionally or alternatively using lower power consumption than the main processor 121 or specialized to a designated function. Here, the auxiliary processor 123 may be operated by being separate from or embedded in the main processor 121.

The auxiliary processor 123 may control at least some functions or states related to at least one component (e.g., the display device 160, the sensor module 176, or the communication module 190) from among the components of the electronic device 101, instead of the main processor 121, when the main processor 121 is in an inactive state (e.g. a sleep state), or along with the main processor 121 when the main processor 121 is in an active state (e.g., performing an application). According to an embodiment, the auxiliary processor 123 (for example, an image signal processor or a communication processor) may be realized as one or more components of other functionally related components (for example, the camera module 180 or the communication module 190). The memory 130 may store various data used by at least one component (e.g., the processor 120 or the sensor module 176) of the electronic device 101, such as software (e.g., the program 140) and input data or output data related to commands related to the software. The memory 130 may include the volatile memory 132 or the nonvolatile memory 134.

The program 140 may be software stored in the memory 130, and may include, for example, an operating system 142, middleware 144, or an application 146.

The input device 150 may be a device configured to receive commands or data to be used by other components (for example, the processor 120) of the electronic device 101 from outside (e.g., a user) of the electronic device 101. For example, the input device 150 may include a microphone, a mouse, or a keyboard.

The sound output device 155 may be a device configured to output a sound signal outside of the electronic device 101, and may include, for example, a speaker used for general purpose, such as multimedia reproduction or recording and reproduction, and a receiver exclusively used for answering a telephone. According to an embodiment, the receiver may be formed to be integrated with the speaker or to be separate from the speaker.

The display device 160 may be a device configured to visually provide information of the user of the electronic device 101, and may include, for example, a display, a hologram device, or a projector and a control circuit for controlling the same. According to an embodiment, the display device 160 may include a touch circuit or a pressure sensor configured to measure an intensity of pressure with respect to a touching operation.

The audio module 170 may convert a sound signal and an electrical signal into each other. According to an embodiment, the audio module 170 may obtain sound via the input device 150 or may output sound via the sound output device 155, or an external electronic device (for example, the electronic device 102 (for example, a speaker or a headphone)) connected with wires or wirelessly to the electronic device 101.

The sensor module 176 may generate an electrical signal or a data value corresponding to an internal operational state (for example, power consumption or temperature) or an external environmental state of the electronic device 101. The sensor module 176 may include, for example, a gesture sensor, a gyro sensor, an atmospheric sensor, a magnetic sensor, an acceleration sensor, a grip sensor, a proximity sensor, a chromatic sensor, an infrared (IR) sensor, a biometric sensor, a temperature sensor, a humidity sensor, or an illuminance sensor.

The interface 177 may support a designated protocol that may be connected to an external electronic device (e.g., the electronic device 102) with wires or wirelessly. According to an embodiment, the interface 177 may include a high definition multimedia interface (HDMI), a universal serial bus (USB) interface, a secure digital (SD) card interface, or an audio interface.

A connection terminal 178 may include a connector which may physically connect the electronic device 101 with an external electronic device (e.g., the electronic device 102), and may include, for example, an HDMI connector, a USB connector, an SD card connector, or an audio connector (e.g., a headphone connector).

The haptic module 179 may convert an electrical signal into a mechanical stimulus (for example, vibration or motion) which a user may recognize through a haptic or a kinesthetic sense, or an electrical stimulus. The haptic module 179 may include, for example, a motor, a piezoelectric device, or an electrical stimulus device.

The camera module 180 may capture a still image or a moving image. According to an embodiment, the camera module 180 may include one or more lenses, an image sensor, an image signal processor, or a flash.

The power management module 188 may be a module for managing power supplied to the electronic device 101 and may be, for example, formed as at least a portion of a power management integrated circuit (PMIC).

The battery 189 may be a device configured to supply power to at least one component of the electronic device 101 and may include, for example, a non-rechargeable first battery, a rechargeable secondary battery, or a fuel battery.

The communication module 190 may support establishment of a wired or wireless communication channel between the electronic device 101 and an external electronic device (e.g., the electronic device 102, the electronic device 104, or the server 108), and may support communication performance via the established communication channel. The communication module 190 may include at least one communication processor configured to support wired communication or wireless communication, wherein the at least one communication processor is separately operated from the processor 120 (e.g., an application processor). According to an embodiment, the communication module 190 may include a wireless communication module 192 (e.g., a cellular communication module, a short range wireless communication module, or a global navigation satellite system (GNSS) communication module), or a wired communication module 194 (e.g., a local area network (LAN) or a power line communication module), and may communicate with the external electronic device by using a corresponding communication module through a first network 198 (e.g., a short range wireless communication network, such as Bluetooth, Wifi-direct, or infrared data association (IrDA)) or a second network 199 (e.g., a remote communication network, such as a cellular network, the Internet, or a computer network (e.g., LAN or WAN)). The various types of the communication module 190 described above may be integrated as one chip or may be formed as separate chips.

According to an embodiment, the wireless communication module 192 may distinguish or authenticate the electronic device 101 in the communication network by using user information stored in the subscriber identification module 196.

The antenna module 197 may include one or more antennas configured to transmit or receive signals or power to or from outside. According to an embodiment, the communication module 190 (e.g., the wireless communication module 192) may transmit or receive signals to or from the external electronic device via an antenna appropriate for a communication module.

One or more of the components described above may be connected to one another via a communication method among peripheral devices (e.g., a bus, a general-purpose input/output (GPIO), a serial peripheral interface (SPI), or a mobile industry processor interface (MIPI)) and may exchange signals (e.g., commands or data) with one another.

According to an embodiment, the commands or data may be transmitted or received between the electronic device 101 and the external electronic device 104 via the server 108 connected to the second network 199. The electronic device 102 and 104 each may be the same as or different from the electronic device 101. According to an embodiment, all or part of operations performed by the electronic device 101 may be performed by another external electronic device or a plurality of external electronic devices. According to an embodiment, when the electronic device 101 is to perform a function or a service automatically or in response to a request, the electronic device 101 may, instead of directly performing the function or the service, or additionally, request at least one function related thereto from the external electronic device. The external electronic device receiving the request from the electronic device 101 may perform the requested function or an additional function and may transmit a result thereof to the electronic device 101. The electronic device 101 may provide the requested function or the requested service as the received result, or by additionally processing the received result. To this end, for example, cloud computing, distributed computing, or client-server computing may be used.

Figure 2:
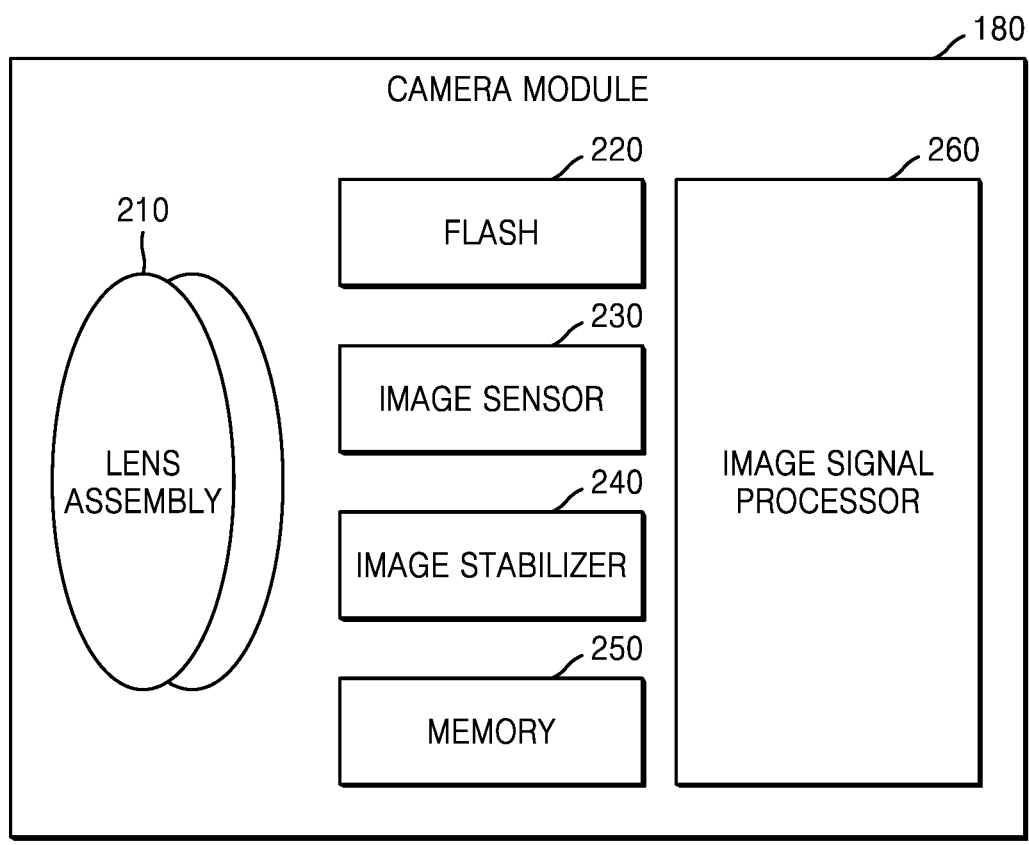
FIG. 2 is a block diagram of a camera module according to embodiments.

FIG. 2 is a block diagram of the camera module 180 according to embodiments. Referring to FIG. 2, the camera module 180 may include a lens assembly 210, a flash 220, an image sensor 230, an image stabilizer 240, a memory 250 (e.g., a buffer memory), or an image signal processor 260. The lens assembly 210 may collect light emitted from an object for image capturing. The lens assembly 210 may include one or more lenses. According to an embodiment, the camera module 180 may include a plurality of lens assemblies 210. In this case, the camera module 180 may be, for example, a dual camera, a 360-degree camera, or a spherical camera. The plurality of lens assemblies 210 may have the same lens characteristics (e.g., an angle of view, a focal distance, an automatic focus, an f number, or an optical zoom), or at least one lens assembly may have a different characteristic from at least another lens assembly. The lens assembly 210 may include, for example, a wide-angle lens or a telephoto lens. The flash 220 may emit a light source used to intensify the light emitted from an object. The flash 220 may include one or more emitting diodes (e.g., a red-green-blue (RGB) light-emitting diode (LED), a white LED, an infrared LED, or an ultraviolet LED), or a xenon lamp.

The image sensor 230 may obtain an image corresponding to an object by converting light transmitted from the object through the lens assembly 210 into an electrical signal. According to an embodiment, the image sensor 230 may include an image sensor selected from images sensors having different characteristics, such as, an RGB sensor, a black and white (BW) sensor, an infra-red (IR) sensor, and an ultra-violet (UV) sensor, a plurality of image sensors having the same characteristics, or a plurality of image sensors having different characteristics. Each of the image sensors included in the image sensor 230 may be realized, for example, as a charged coupled device (CCD) sensor or a complementary metal oxide semiconductor (CMOS) sensor.

In response to a motion of the camera module 180 or the electronic device 101 including the camera module 180, the image stabilizer 240 may move or control (e.g., adjust read-out timing, etc.) at least one lens included in the lens assembly 210 or the image sensor 230 in a certain direction in order to at least partially compensate for a negative effect (e.g., image shake) with respect to a photographed image, caused by the motion. According to an embodiment, the image stabilizer 240 may be realized, for example, as an optical image stabilizer, and may sense the motion by using a gyro sensor (not shown) or an acceleration sensor (not shown) provided inside or outside the camera module 180.

The memory 250 may at least temporarily store at least a portion of the image obtained via the image sensor 230 for a next image processing operation. For example, when an operation of obtaining an image is delayed due to a shutter, or a plurality of images are obtained at high speed, the obtained original image (e.g., an image having high resolution) may be stored in the memory 250 and a copy image (e.g., an image having low resolution) corresponding to the original image may be previewed through the display device 160. Thereafter, when designated conditions are met (e.g., a user input or a system command), at least a portion of the original image stored in the memory 250 may be, for example, obtained and processed by the image signal processor 260. According to an embodiment, the memory 250 may be formed as at least a portion of the memory 130, or as a separate memory operating separately from the memory 130.

The image signal processor 260 may perform image processing (e.g., depth map generation, three-dimensional modelling, panorama generation, feature extraction, image blending, or image compensation (e.g., noise reduction, resolution adjustment, brightness adjustment, blurring, sharpening, or softening)) with respect to the image obtained via the image sensor 230 or the image stored in the memory 250. Additionally, or alternatively, the image signal processor 260 may control (e.g., exposure time controlling, read-out timing controlling, etc.) at least one (e.g., the image sensor 230) of components included in the camera module 180. The image processed by the image signal processor 260 may be re-stored in the memory 250 for additional processing or may be transmitted to components (e.g., the memory 130, the display device 160, the electronic device 102, the electronic device 104, or the server 108) outside the camera module 180. According to an embodiment, the image signal processor 260 may be formed as at least a portion of the processor 120 or as a separate processor operating separately from the processor 120. When the image signal processor 260 is formed as a separate processor, the images processed by the image signal processor 260 may be directly displayed via the display device 160 or may be additionally processed by the processor 120 and displayed via the display device 160.

According to an embodiment, the electronic device 101 may include more than two camera modules 180 having different attributes or functions. In this case, for example, at least one camera module 180 may be a wide-angle camera or a front camera, and at least another camera module 180 may be a telephoto camera or a rear camera.

The electronic device according to embodiments disclosed in this specification may be various types of devices. The electronic devices may include, for example, at least one of a portable communication device (e.g., a smartphone), a computer device, a portable multimedia device, a portable medical device, a camera, a wearable device, and a home appliance device. The electronic device according to the embodiments are not limited thereto.

Various embodiments in this specification may be realized as software (e.g., the program 140) including instructions stored in machine (e.g., a computer)-readable storage media (e.g., the embedded memory 136 or an external memory 138). The machine may be a device capable of calling the instructions stored in the storage media and performing an operation in response to the called instructions, and may include the electronic device (e.g., the electronic device 101) of the embodiments disclosed herein. When the instructions are executed by the processor (e.g., the processor 120), the processor may, directly, or by using other components under control of the processor, perform functions corresponding to the instructions. The instructions may include a code generated or executed by a compiler or an interpreter. The machine-readable storage media may be provided as non-transitory storage media. Here, the term "non-transitory" may denote that the storage media do not include signals and are tangible and may not distinguish between semi-permanent storage and temporary storage of data in the storage media.

According to an embodiment, the method according to various embodiments disclosed in this specification may be provided by being included in a computer program product. The computer program product may be transacted between a purchaser and a seller as a product. The computer program product may be distributed as a machine-readable storage media (e.g., a compact disc read only memory (CD-ROM) or may be distributed online through an application store (e.g., a Play Store™). In the case of the online distribution, at least a portion of the computer program product may be at least temporally stored in a storage medium, such as a server of a manufacturer, a server of an application store, or a memory of a broadcasting server, or may be temporally generated.

Each of the components (e.g., the module or the program) of the various embodiments may be formed as a singular component or multiple components, and one or more of the sub-components described above may be omitted or other sub-components may be further included in the various embodiments. Alternatively, or additionally, one or more components (e.g., the module or program) may be integrated as one unit and may perform the function performed by each corresponding component before the components are integrated, in the same or substantially the same way. The operations performed by the module, the program, or other components according to the various embodiments may be performed in a sequential, parallel, iterative, or heuristic way. Also, at least one of the operations may be performed in a changed order or omitted, or another operation may be added to the operations.

Figure 3:
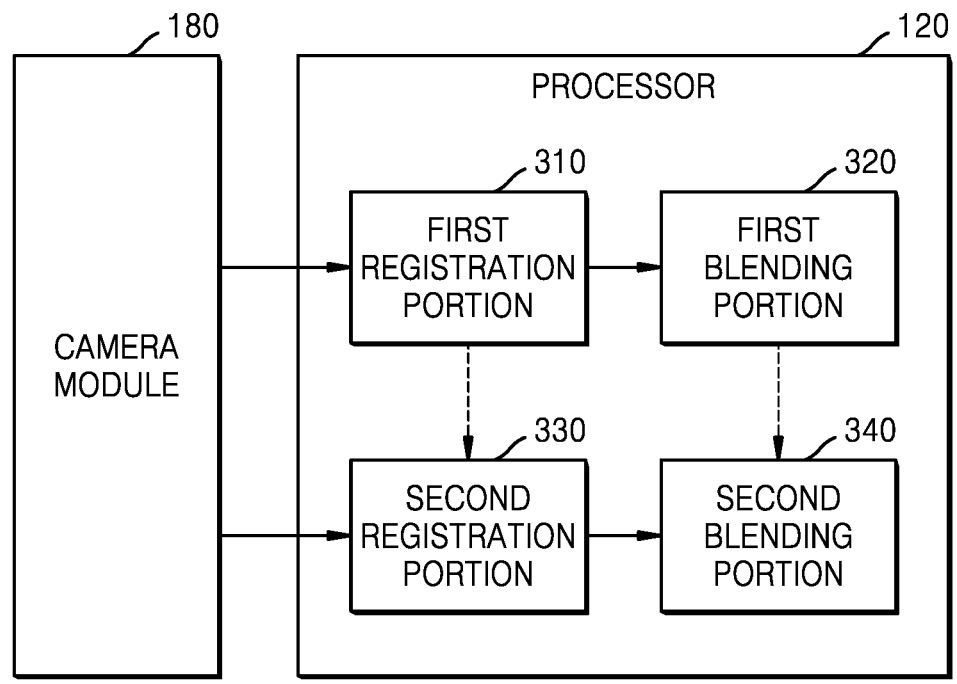
FIG. 3 is a general block diagram for describing a device for providing an image, according to embodiments.

FIG. 3 is a general block diagram for describing a device for providing an image, according to embodiments.

Referring to FIG. 3, the processor 120 may include a first registration portion 310, a first blending portion 320, a second registration portion 330, and a second blending portion 340.

According to an embodiment, the first registration portion 310 and the first blending portion 320 may generate images that are the basis of a moving image to be output via the display device 160, by correcting images obtained from the camera module 180 to output the moving image (or a video). According to an embodiment, the first registration portion 310 and the first blending portion 320 may generate each of the images that are the basis of the moving image to be output via the display device 160, by correcting one or more of a plurality of images (hereinafter, referred to as "first attribute images") having a first attribute with respect to an external object obtained from the camera module 180. For example, the first registration portion 310 and the first blending portion 320 may generate one image (hereinafter, referred to as a "first image") by correcting the designated (or pre-set or pre-determined) number of images (referred to as a "first image set") of the first attribute images. However, the disclosure is not limited thereto, and the first registration portion 310 and the first blending portion 320 may generate more than two first images by correcting the first image set. The processor 120 may control the display device 160 to sequentially output the first images to provide the moving image to a user.

According to an embodiment, the second registration portion 330 and the second blending portion 340 may generate a still image (hereinafter, referred to as a "second image") by performing a correcting operation at least partially based on information for generating the first image. According to an embodiment, the second registration portion 330 and the second blending portion 340 may generate the second image by correcting a plurality of images (hereinafter, referred to as "second attribute images") obtained from the camera module 180 and having a second attribute with respect to an external object, at least partially based on the information for generating the first image. According to an embodiment, the second attribute images may be images obtained via the second registration portion 330 from the camera module 180 at a time point corresponding to a time point in which a signal corresponding to an image capture of the external object is received. For example, the second attribute images may include at least one of: (1) a first image obtained via the second registration portion 330 from the camera module 180 at the time point in which the signal corresponding to the image capture of the external object is received, (2) a second image frame obtained directly previous to the first image frame, and (3) a third image frame obtained directly next to the first image frame. However, the disclosure is not limited thereto.

According to an embodiment, the second registration portion 330 and the second blending portion 340 may generate one second image by correcting the designated number (e.g., 3 to 5) of second attribute images. However, the disclosure is not limited thereto, and the second registration portion 330 and the second blending portion 340 may generate more than two second images by correcting the second attribute images.

According to an embodiment, a size (or a data capacity) of each of the first attribute images (or the first image set) may be less than a size of each of the second attribute images. For example, the first attribute images may be images generated by the image signal processor 260 by converting (or downsizing or downscaling) images obtained from the image sensor 230 into smaller sizes. However, the disclosure is not limited thereto.

According to an embodiment, the size of each of the second attribute images may be greater than the size of each of the first attribute images. According to an embodiment, the second attribute images may be images that are obtained by the image signal processor 260 from the image sensor 230 and are not converted into the smaller sizes, but are not limited thereto.

According to an embodiment, while the first registration portion 310 and the first blending portion 320 generate the first image, the second registration portion 330 and the second blending portion 340 may generate the second image at least partially based on a user input. According to an embodiment, a correction operation performed by the first registration portion 310 and the first blending portion 320 may be performed in parallel with a correction operation performed by the second registration portion 330 and the second blending portion 340.

Hereinafter, for convenience of explanation, it will be assumed that the first image set is the first attribute images obtained by the first registration portion 310 from the camera module 180 at a time point (e.g., a time point in which a user input for obtaining a still image is received) corresponding to a time point in which a signal corresponding to an image capture with respect to an external object is received.

Hereinafter, operations of the first registration portion 310, the first blending portion 320, the second registration portion 330, and the second blending portion 340 will be described in detail.

According to an embodiment, the first registration portion 310 may pre-process the first image set obtained from the camera module 180. For example, the first registration portion 310 may correct the first image set by using an image processing algorithm for correcting an optical defect of the camera module 180 or a defect of manufacture. However, the defect corrected by the pre-processing is not limited thereto. According to an embodiment, the pre-processing operation performed by the first registration portion 310 may be omitted. According to an embodiment, a component for performing the pre-processing operation may be separate from the first registration portion 310 and may be included in the processor 120. According to an embodiment, the component for performing the pre-processing operation may be separate (e.g., the camera module 180) from the processor 120. According to an embodiment, the pre-processing operation may be repeatedly performed by a separate component from the processor 120. For example, after the camera module 180 pre-processes one image, the processor 120 may pre-process again the image pre-processed by the camera module 180.

According to an embodiment, the first registration portion 310 may detect (or extract) an attribute of each of images included in the first image set. For example, the first registration portion 310 may detect the attribute including at least one of a reference axis of each of the images included in the first image set, a location of an external object, and an edge location. However, the attribute detected by the first registration portion 310 is not limited thereto.

According to an embodiment, the first registration portion 310 may calculate information (or information needed for registration) (hereinafter, referred to as "first registration information") for registering the first image set, at least partially based on the detected attribute. According to an embodiment, the information for registering the first image set may include information about a difference between an attribute of an image (hereinafter, referred to as a first reference image (or a first reference image frame)) designated from among the images included in the first image set and an attribute of at least one image (hereinafter, referred to as "a first rest image") except the first reference image. For example, when the first image set includes the first image frame, the second image frame and the third image frame, the first image frame is the first reference image and the attribute for comparison among the image frames is a reference axis (or a location of the reference axis). The information for registering the first image set may include: (1) information about a difference between the reference axis of the first image frame and the reference axis of the second image frame and (2) information about a difference between the reference axis of the first image frame and the reference axis of the third image frame.

According to an embodiment, the processor 120 may designate (or set) an image or an image frame obtained last, from among the images included in the first image set obtained from the camera module 180, as the reference image. However, the method of designating the reference image is not limited thereto. For example, the processor 120 may determine an image having a greatest resolution (or degree of resolution) (or having a lowest degree of blur or having a greatest contrast difference between an image area corresponding to an external object and a background area), from among the images included in the first image set obtained from the camera module 180, as the reference image. According to an embodiment, the operation of determining the reference image with respect to the images included in the first image set by the processor 120 may be performed between a time point in which the first registration portion 310 obtains the first image set from the camera module 180 and a time point in which the first registration portion 310 calculates the registration information.

According to an embodiment, the first registration portion 310 may store the first registration information in a buffer (or the memory 130).

According to an embodiment, the first registration portion 310 may register (or warp) the first image set at least partially based on the first registration information and the pre-processed first image set. According to an embodiment, the first registration portion 310 may register the first rest image to correspond to (or overlap) the first reference image. For example, the first registration portion 310 may perform, at least partially based on a difference between the reference axis of the first reference image and the reference axis of the first rest image, at least one of transferring and rotation operations of a reference axis (or a coordinate of the reference axis) of the first rest image such that the reference axis corresponds to the reference axis of the first reference image.

According to an embodiment, the first blending portion 320 may, at least partially based on the registered first image set and the first registration information, calculate information for blending the images included in the first image set (or information needed to perform synthesis) (hereinafter, referred to as "first blending information"). According to an embodiment, the first blending portion 320 may determine a weight (hereinafter, referred to as a "first weight") with respect to the images included in the first image set, as the first blending information. According to an embodiment, the first blending portion 320 may determine the weight of each of pixels of the images included in the first image set, at least partially based on the first registration information. The operation of determining the first weight will be described by referring to the equations below.

$$W_{pix} = W_{Gi} \times W_{Lo} \qquad \text{[Equation 1]}$$

$$W_{Gi} = [\text{frame}_{ref} - \text{frame}_{non}]_{Nor} \times [\text{Rot}_{ref} - \text{Rot}_{non}]_{Nor} \times [\text{Tran}_{ref} - \text{Trans}_{non}]_{Nor} \qquad \text{[Equation 2]}$$

$$W_{Lo} = [D_{(non,\ ref)}]_{Nor},\ D_{(non,\ ref)} = \text{Pix}_{non} - \text{Pix}_{ref} \qquad \text{[Equation 3]}$$

In the above equations, $W_{pix}$ (the weight of the pixel of the first rest image) may denote the weight of each of the pixels of the first rest image, $W_{Gi}$ (a global weight of the first rest image) may denote the weight calculated based on the difference between the first reference image and the first rest image, and $W_{Lo}$ (a local weight of the first rest image) may denote the weight calculated based on a difference (e.g., a brightness difference, a color difference, a chromatic difference, or a combination thereof) between values of the pixels of the first rest image and values of the pixels of the first reference image.

According to an embodiment, the weights of the pixels of the first rest image may be calculated by multiplying the global weight of the first rest image by the local weight of the first rest image.

According to an embodiment, the global weight of the first rest image may be calculated by multiplying a value $[\text{frame}_{ref} - \text{frame}_{non}]_{Nor}$ obtained by normalizing a distance difference between the first reference image frame $\text{frame}_{ref}$ and the first rest image frame $\text{frame}_{non}$ by a value $[\text{Rot}_{ref} - \text{Rot}_{non}]_{Nor}$ obtained by normalizing an angle difference (or an angle by which the reference axis of the first rest image is rotated to correspond to the reference axis of the first reference image in the registration operation) between the reference axis of the first reference image and the reference axis of the first rest image, and a value $[\text{Tran}_{ref} - \text{Trans}_{non}]_{Nor}$ obtained by normalizing a difference (or a value of a coordinate to which the reference axis of the first rest image is transferred, in order to correspond to the reference axis of the first reference image in the registration operation) of a location (or a coordinate) between the reference axis of the first reference image and the reference axis of the first rest image. With respect to the distance difference between the first reference image frame $\text{frame}_{ref}$ and the first rest image frame $\text{frame}_{non}$, for example, when the first image set includes the first image frame, the second image frame, and the third image frame that are sequentially (according to time) obtained and the first image frame is the first reference image, the distance difference between the first image frame and the second image frame may be determined as 1 and the distance difference between the first image frame and the third image frame may be determined as 2.

According to an embodiment, the local weight of the first rest image may be calculated as a value $[D_{(non,\ ref)}]_{Nor}$ obtained by normalizing a difference $D_{(non,\ ref)} = \text{Pix}_{non} - \text{Pix}_{ref}$ between values of the pixels of the first rest image and values of the pixels of the first reference image, the pixels of the first reference image being at coordinates corresponding to coordinates of the pixels of the first rest image.

However, the method of calculating the weights of the pixels of the first rest image is not limited thereto and may include various methods.

According to an embodiment, the weights of the pixels of the first reference image may be determined to be greater than the weights of the pixels of the first rest image.

According to an embodiment, the first blending portion 320 may generate a blending map with respect to each of the first reference image and the first rest image at least partially based on the weights of the pixels of the first reference image and the weights of the pixels of the first rest image.

According to an embodiment, the first blending portion 320 may store the calculated first blending information in a buffer.

According to an embodiment, the first blending portion 320 may blend (or may perform an operation of blending) the first image set, at least partially based on the registered first image set and the first blending information. For example, the first blending portion 320 may blend the first image set at least partially based on values obtained by multiplying the values of the pixels of each of the images included in the first image set by the weights of the pixels of each of the images included in the first image set. For example, values of the blended images may correspond to the values obtained by multiplying the values of the pixels of each of the images included in the first image set by the weights of the pixels of each of the images included in the first image set.

According to an embodiment, the first blending portion 320 may post-process the blended first image set to generate a first image. For example, the first blending portion 320 may generate the first image by applying a processing algorithm for processing the blended first image set as a high-quality color image (e.g., an image having improved high dynamic range (HDR), a super resolution image, a low light shot image, and an image having reduced motion blur).

According to an embodiment, a component for performing the post-processing operation may be included in the processor 120 as a separate component from the first blending portion 320. According to an embodiment, the component for performing the post-processing operation may be performed by the component separate from (or in addition to) the processor 120. According to an embodiment, the post-processing operation may be repeatedly performed by the separate component. For example, after the processor 120 post-processes the image, the component separate from the processor 120 may post-process again the image post-processed by the processor 120.

According to an embodiment, the processor 120 may control the display device 160 to display the first image. According to an embodiment, the first image may be a preview image output in real time or a video image output and then stored.

According to an embodiment, the second registration portion 330 may obtain second attribute images from the camera module 180 based on reception of a signal corresponding to an image capture with respect to an external object. According to an embodiment, at least one or more of the second attribute images may correspond to the first image set. According to an embodiment, when the image sensor generates original images for a first hour, the first image set may correspond to images generated by the image signal processor 260 by processing the original images obtained from the image sensor 230 for the first hour so as to have a first attribute, and the second attribute images may correspond to images (or the original images on which the processing operation is not performed by the image signal processor 260) generated by the image signal processor 260 by processing the original images obtained from the image sensor 230 for the first hour so as to have a second attribute. For example, when the first image set includes: (1) the first image frame having the first attribute obtained by the first registration portion 310 from the camera module 180 at a first time point in which a signal corresponding to the image capture of the external object is received and (2) the second image frame having the first attribute obtained by the first registration portion 310 from the camera module 180 at a second time point, which is directly previous to the first time point, the second attribute images may include: (a) the third image frame having the second attribute obtained by the second registration portion 330 from the camera module 180 at the first time point and (b) the fourth image frame having the second attribute obtained by the second registration portion 330 from the camera module 180 at the second time point. However, the disclosure is not limited thereto, and the second attribute images may further include an image (e.g., an image frame obtained at a third time point that is directly previous to the second time point), in addition to the images corresponding to the first image set, or may not include at least one of the images corresponding to the first image set.

According to an embodiment, the second registration portion 330 may pre-process the second attribute images obtained from the camera module 180. According to an embodiment, at least a portion of the operation of pre-processing the second attribute images via the second registration portion 330 may be the same or substantially the same as the operation of pre-processing the images included in the first image set, via the first registration portion 310, and thus, its detailed description will be omitted.

According to an embodiment, the second registration portion 330 may register the second attribute images at least partially based on the first registration information. According to an embodiment, the second registration portion 330 may calculate (or determine) second registration information by using the first registration information obtained from the first registration portion 310, without performing an operation of detecting a feature of each of the second attribute images and an operation of calculating information (hereinafter, referred to as the "second registration information") for registering the second attribute images at least partially based on the feature of each of the second attribute images. According to an embodiment, the second registration information may include information about a difference between a feature of a designated image (hereinafter, referred to as "a second reference image (or a second reference image frame)") from among the second attribute images and a feature of at least one image (hereinafter, referred to as "a second rest image") except the second reference image. For example, when: (1) the second attribute images include a first image frame, a second image frame and a third image frame, (2) the third image frame is the second reference image, and (3) a feature for comparison among the image frames is a reference axis (or a location of the reference axis), the second registration information may include: (a) information about a difference between the reference axis of the third image frame and the reference axis of the first image frame and (b) information about a difference between the reference axis of the third image frame and the reference axis of the first image frame.

According to an embodiment, the processor 120 may determine an image having a greatest resolution (or degree of resolution) (or having a lowest degree of blur or having a greatest contrast difference between an image area corresponding to an external object and a background area) from among the second attribute images obtained from the camera module 180, as the reference image. According to an embodiment, the operation of determining the reference image from among the second attribute images via the processor 120 may be performed between a time point in which the second registration portion 330 obtains the second attribute images from the camera module 180 and a time point in which the second registration portion 330 obtains the second registration information from the first registration information.

According to another embodiment, the processor 120 may designate (or set) an image obtained last, among the second attribute images obtained from the camera module 180, as the reference image. However, the method of designating the reference image is not limited thereto.

According to an embodiment, the second registration portion 330 may determine at least one of whether the second reference image corresponds to the first reference image and whether a size of the images included in the first image set is equal to a size of the images included in the second attribute images.

According to an embodiment, when the second registration portion 330 determines that the second reference image corresponds to the first reference image and the size of the images included in the first image set is equal to the size of the images included in the second attribute images, the second registration portion 330 may determine the first registration information to be the second registration information.

According to another embodiment, when the second registration portion 330 determines that the second reference image does not correspond to the first reference image, the second registration portion 330 may calculate the second registration information by changing the first registration information at least partially based on the second reference image.

According to another embodiment, when the second registration portion 330 determines that the size of the images included in the first image set is not equal to the size of the images included in the second attribute images, the second registration portion 330 may obtain the second registration information by scaling (or resizing) the first registration information.

According to another embodiment, when the second registration portion 330 determines that the second reference image does not correspond to the first reference image and the size of the images included in the first image set is not equal to the size of the images included in the second attribute images, the second registration portion 330 may obtain the second registration information by performing an operation of changing the first registration information at least partially based on the second reference image and an operation of scaling (or resizing) the first registration information.

The operation of obtaining the second registration information at least partially based on the first registration information will be described with reference to FIG. 4.

Figure 4:
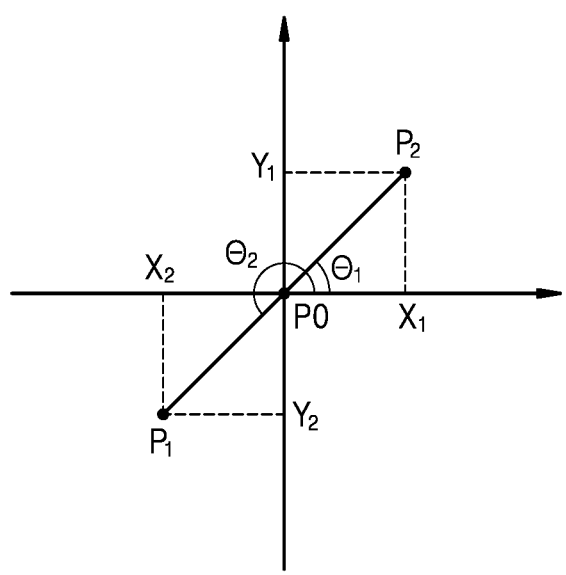
FIG. 4 is a view for describing a method of registering an image, according to embodiments.

FIG. 4 is a view for describing a method of registering an image, according to embodiments.

Referring to FIG. 4, when the first image set includes a first-first image frame, a second-first image frame and a third-first image frame, the first-first image frame is the first reference image frame and the first registration information includes information about the differences among the reference axes. P0 may represent a central coordinate of the reference axis of the first-first image frame. P1 may represent a central coordinate of the reference axis of the second-first image frame, the reference axis of the second-first image frame being relative to the reference axis of the first-first image frame. P2 may represent a central coordinate of the reference axis of the third-first image frame, the reference axis of the third-first image frame being relative to the reference axis of the first-first image frame. When P is represented as an x axis coordinate, a y axis coordinate, and an angle difference between the reference axis of the reference image frame and the reference axis of the rest image frame, P0, P1, and P2 may be represented as P0 (0,0,0), P1 (X1,Y1, θ1), P2 (X2, Y2, θ2).

According to an embodiment, when: (1) the second attribute images include a first-second image frame corresponding to the first-first image frame, a second-second image frame corresponding to the second-first image frame and a third-second image frame corresponding to the third-first image frame and (2) the second reference image is the second-second image frame, then: (a) P3, which is a central coordinate of the reference axis of the second-first image frame, the reference axis of the second-first image frame being relative to the reference axis of the second-second image frame, may be calculated as P3 (0-X1, 0-Y1, 0-θ1), (b) P4, which is a central coordinate of the reference axis of the second-second image frame may be calculated as P4 (X1,Y1, θ1), and (c) P5, which is a central coordinate of the reference axis of the third-second image frame, the reference axis of the third-second image frame being relative to the reference axis of the second-first image frame, may be calculated as P5 (X2-X1,Y2-Y1, θ2-θ1).

According to an embodiment, when the central coordinate of the reference axis of the first reference image is P0 (0,0,0), a central coordinate of the reference axis of each of the image frames included in the first image set is Pn (Xn, Yn, θn), where the reference axis is relative to the reference axis of the first reference image. A central coordinate of the reference axis of the second reference image is Pa (Xa, Ya, θa). A central coordinate of the reference axis of each of the second attribute images may be calculated as P' (Xn-Xa, Yn-Ya, θn-θa). According to an embodiment, when the second registration portion 330 determines that the second reference image does not correspond to the first reference image, the second registration portion 330 may calculate the second registration information by transferring the first registration information based on the second reference image.

According to an embodiment, when the first reference image and the second reference image correspond to each other, the central coordinate of the reference axis of each of the image frames included in the first image set is Pm (Xm, Ym, θm), where the reference axis is relative to the reference axis of the first reference image. A horizontal size (or a width) of each of the image frames included in the first image set is Wv, a vertical size (or a height) of each of the image frames included in the first image set is Hv, a horizontal size (or a width) of each of the second attribute images is Ws, a vertical size (or a height) of each of the second attribute images is Hs, and a central coordinate of the reference axis of each of the second attribute images may be calculated as P' (Xm* (Ws/Wv), Ym, Hs/Hv), θm). According to an embodiment, when the second registration portion 330 determines that the size of the images included in the first image set is not equal to the size of the images included in the second attribute images, the second registration portion 330 may determine the second registration information by scaling (or resizing) the first registration information, for example, by Ws/Wv with respect to the vertical axis of the image and Hs/Hv with respect to the vertical axis of the image.

According to an embodiment, when the second registration portion 330 determines that the second reference image does not correspond to the first reference image and the size of the images included in the first image set is not equal to the size of the images included in the second attribute images, the second registration portion 330 may determine the second registration information by performing an operation of transferring the first registration information based on the second reference image or an operation of scaling the first registration information.

According to an embodiment, the second registration portion 330 may calculate the second registration information without using the first registration information. For example, the second registration portion 330 may detect (or extract) an attribute of each of the second attribute images. The second registration portion 330 may calculate the second registration information by calculating a difference among the detected features of the second attribute images.

According to an embodiment, the second registration portion 330 may register the second attribute images at least partially based on the second registration information and the pre-processed second attribute images. According to an embodiment, the second registration portion 330 may register the second rest image to correspond to (or overlap) the second reference image. For example, the second registration portion 30 may perform at least one of operations of transferring and rotating the reference axis of the second rest image to correspond to the reference axis of the second reference image at least partially based on a difference between the reference axis of the second reference image and the reference axis of the second rest image.

According to an embodiment, the second blending portion 340 may determine information (or information needed for performing a blending operation) (hereinafter, referred to as "second blending information") for blending the second attribute images at least partially based on the registered second attribute images and the first blending information. According to an embodiment, the second blending portion 340 may calculate (or determine) the second blending information by using the first blending information obtained from the first blending portion 320, without performing the operation of calculating the blending information at least partially based on the registered second attribute images and the second registration information.

According to an embodiment, the second blending portion 340 may determine a weight (hereinafter, referred to as a "second weight") with respect to the second attribute images, as the second blending information.

According to an embodiment, the second blending portion 340 may determine at least one of whether the second reference image corresponds to the first reference image, whether the number of images included in the first image set is equal to the number of second attribute images, and whether a size of the images included in the first image set is equal to a size of the images included in the second attribute images.

According to an embodiment, when: (1) the second reference image corresponds to the first reference image, (2) the number of images included in the first image set is equal to the number of second attribute images, and (3) the size of the images included in the first image set is equal to the size of the images included in the second attribute images, the second blending portion 340 may determine the first blending information to be the second blending information.

According to an embodiment, when the second reference image does not correspond to the first reference image, the second blending portion 340 may calculate the second blending information by changing the first blending information to correspond to the second reference image (or based on the second reference image, or adaptively with respect to the second reference image). The operation of calculating the second blending information by changing the first blending information based on the second reference image will be described by referring to the equations below.

$$W_{pix} = W_{Gl} \times W_{Lo} \qquad \text{[Equation 4]}$$

$$W_{Gl} = [Blur_{ref} - Blur_{non}]_{Nor} \times [frame_{ref} - frame_{non}]_{Nor} \times [Rot_{ref} - Rot_{non}]_{Nor} \times [Tran_{ref} - Trans_{non}]_{Nor} \qquad \text{[Equation 5]}$$

$$W_{Lo} = [D_{(non, ref)}]_{Nor}, D_{(non, ref)} = Pix_{non} - Pix_{ref} \qquad \text{[Equation 6]}$$

In the above equations, $W_{pix}$ (a weight of each of pixels of the second rest image) may denote a weight of each of the pixels of the second rest image, $W_{Gl}$ (a global weight of the second rest image) may denote a weight calculated based on a difference between the second reference image and the second rest image, and $W_{Lo}$ (a local weight of the second rest image) may denote a weight calculated based on a difference (e.g., a brightness difference, a color difference, a chromatic difference, or a combination thereof) between the values of the pixels of the second rest image and the values of the pixels of the second reference image.

According to an embodiment, the weights of the pixels of the second rest image may be calculated by multiplying the global weight of the second rest image by the local weight of the second rest image.

According to an embodiment, the global weight of the second rest image may be calculated by multiplying a value $[Blur_{ref} - Blur_{non}]_{Nor}$ obtained by normalizing a difference between a value numerically representing a degree of blur (or a degree of resolution) of the second reference image frame and a value numerically representing a degree of blur of the second rest image frame by: (1) a value $[frame_{ref} - frame_{non}]_{Nor}$ obtained by normalizing a distance difference between the second reference image frame $frame_{ref}$ and the second rest image frame $frame_{non}$, (2) a value $[Rot_{ref} - Rot_{non}]_{Nor}$ obtained by normalizing an angle difference (or an angle by which the reference axis of the first rest image is rotated, in order to correspond to the reference axis of the first reference image) between the reference axis of the first reference image and the reference axis of the first rest image, and (3) a value $[Tran_{ref} - Trans_{non}]_{Nor}$ obtained by normalizing a location (coordinate) difference (or a value of a coordinate to which the reference axis of the first rest image is transferred, in order to correspond to the reference axis of the first reference image in the registration operation) between the reference axis of the first reference image and the reference axis of the first rest image. According to an embodiment, when the processor 120 determines the second reference image from among the second attribute images based on the degree of blur, the processor 120 may calculate the degree of blur of the second reference image frame and the second rest image frame to determine the second reference image.

According to an embodiment, the local weight of the second reference image may be a value $[D_{(non, ref)}]_{Nor}$ obtained by normalizing a difference $D_{(non, ref)} = Pix_{non} - Pix_{ref}$ between values of the pixels of the second rest image and values of the pixels of the second reference image, the pixels of the second reference image being at coordinates corresponding to coordinates of the pixels of the second rest image. According to an embodiment, the second registration portion 330 may calculate the local weight of the second rest image by using the local weight of the first rest image calculated by the first registration portion 310. According to an embodiment, the second registration portion 330 may calculate the local weight of the second rest image by performing vector calculation on the local weight of the first rest image calculated by the first registration portion 310.

For example, it may be assumed that: (1) the first-first image frame, (2) the second-first image frame, and (3) the third-first image frame included in the first image set correspond to (a) the first-second image frame, (b) the second-second image frame, and (c) the third-second image frame included in the second attribute images, respectively. The first reference image is third-first image frame and the second reference image is the first-second image frame. The second blending portion 340 may obtain information about a difference D (1,3) between: (A) a value of the pixels of the first-first image frame and a value of the pixels of the third-first image frame, the pixels of the third-first image frame being at coordinates corresponding to coordinates of the pixels of the first-first image frame and (B) a difference D (2,3) between a value of the pixels of the second-first image frame and a value of the pixels of the third-first image frame, the pixels of the third-first image frame being at coordinates corresponding to coordinates of the pixels of the second-first image frame. The second blending portion 340 may calculate a difference D (2,1) between a value of the pixels of the second-second image frame and a value of the pixels of the first-second image frame, the pixels of the first-second image frame being at coordinates corresponding to coordinates of the pixels of the second-second image frame. The difference may be calculated by subtracting (or by performing an operation of subtracting) D (1,3) from D (2,3). The second blending portion 340 may change the sign with respect to D (1,3) as a minus (−) sign, to calculate the difference D (2,1) between a value of the pixels of the third-second image frame and a value of the pixels of the first-second image frame, the pixels of the first-second image frame being at coordinates corresponding to coordinates of the pixels of the third-second image frame.

According to an embodiment, the weights of the pixels of the second reference image may be determined to be greater than the weights of the pixels of the first rest image.

According to an embodiment, when the number of images included in the first image set is not equal to the number of second attribute images, the second blending portion 340 may calculate the second blending information by changing the first blending information to correspond to the number of second attribute images. According to an embodiment, when the number of images included in the first image set is not equal to the number of second attribute images, the second registration portion 330 may calculate the second blending information by extrapolation using equation 7.

$$B_{n+1} = B_{n-1} + \frac{(x_{n+1} - x_n)}{(x_n - x_{n-1})} \times B_n \qquad \text{[Equation 7]}$$

It may be assumed that the first-first image frame, the second-first image frame, and the third-first image frame included in the first image set correspond to the first-second image frame, the second-second image frame, and the third-second image frame included in the second attribute images, respectively. The second attribute images include a fourth-second image frame obtained at a time point right after a time point in which the third-second image frame is obtained. In Equation 7, $B_{n+1}$ is a weight of each of pixels of the fourth-second image frame, $B_n$ may be a weight of each of pixels of the third-first image frame, and $B_{n-1}$ may be a pixel weight of the second-first image frame. In Equation 7, $x_{n+1}-x_n$ may denote a distance difference between the fourth-second image frame and the third-second image frame and $x_n-x_{n-1}$ may denote a distance difference between the third-second image frame and the second-second image frame. However, it is not limited thereto. For example, $x_{n+1}-x_n$ may be a value determined by a distance difference between the fourth-second image frame and the third-second image frame, an angle difference between the reference axis of the fourth-second image frame and the reference axis of the third-second image frame, a location difference between the reference axis of the fourth-second image frame and the reference axis of the second-third image frame, or a combination thereof. For example, $x_n-x_{n-1}$ may be a value determined by a distance difference between the third-second image frame and the second-second image frame, an angle difference between the reference axis of the third-second image frame and the reference axis of the second-second image frame, a location difference between the reference axis of the third-second image frame and the reference axis of the second-second image frame, or a combination thereof.

According to an embodiment, when a size of the images included in the first image set is not equal to a size of the images included in the second attribute images, the second blending portion 340 may calculate the weights of the pixels to correspond to the sizes of the second attribute images by using interpolation. According to an embodiment, when the number of pixels of the images included in the first image set is less than the number of pixels of the images included in the second attribute images, weights of the pixels of the images included in the second attribute images may be calculated by applying interpolation with respect to the weights of the pixels of the images included in the second attribute images. The pixels of the images included in the second attribute images being at coordinates except for coordinates of the pixels of the images included in the second attribute images. The coordinates of the pixels of the images included in the second attribute images corresponding to coordinates of the pixels of the images included in the first image set. The pixels of the images included in the second attribute images being at the coordinates corresponding to the coordinates of the pixels of the images included in the first image set.

According to an embodiment, the applied interpolation may include bi-linear interpolation, bi-cubic interpolation, a low pass filter, an edge detection filter, or the like. However, it is not limited thereto.

According to an embodiment, when the second reference image does not correspond to the first reference image and the number of images included in the first image set is not equal to the number of second attribute images, the second blending portion 340 may calculate the second blending information by calculating weights of the pixels to correspond to the second reference image and applying extrapolation with respect to the calculated weights of the pixels.

According to an embodiment, when the second reference image does not correspond to the first reference image and the size of the images included in the first image set is not equal to the size of the images included in the second attribute images, the second blending portion 340 may calculate the second blending information by calculating weights of the pixels to correspond to the second reference image and applying interpolation with respect to the calculated weights of the pixels.

According to an embodiment, when the number of images included in the first image set is not equal to the number of second attribute images and the size of the images included in the first image set is not equal to the size of the images included in the second attribute images, the second blending portion 340 may calculate the second blending information by applying extrapolation and interpolation with respect to the first weight. According to an embodiment, the second blending portion 340 may calculate the second blending information by applying the interpolation with respect to the calculated weights of the pixels after applying the extrapolation with respect to the first weight or applying the extrapolation with respect to the calculated weights of the pixels after applying the interpolation with respect to the first weight.

According to an embodiment, when: (1) the second reference image does not correspond to the first reference image, (2) the size of the images included in the first image set is not equal to the size of the images included in the second attribute images, and (3) the number of images included in the first image set is not equal to the number of second attribute images, the second blending portion 340 may calculate the second blending information by: (a) calculating the weights of the pixels to correspond to the second reference image and (b) applying extrapolation and interpolation with respect to the calculated weights of the pixels.

According to an embodiment, the second blending portion 340 may calculate the second blending information at least partially based on the second attribute images registered by the second registration portion 330 and the second registration information calculated by the second registration portion 330, without using the first blending information obtained by the first blending portion 320. The method of calculating the second blending information at least partially based on the second attribute images registered by the second registration portion 330 and the second registration information calculated by the second registration portion 330 may be at least partially the same or substantially the same as the method of calculating the first blending information at least partially based on the first image set registered by the first registration portion 310 and the first registration information calculated by the first registration portion 310, and thus, its detailed description will be omitted.

According to an embodiment, the method of calculating the second blending information is not limited thereto and may include various methods.

According to an embodiment, the second blending portion 340 may generate a blending map with respect to each of the second reference image and the second rest image at least partially based on the weights of the pixels of the second reference image and the weights of the pixels of the second rest image.

According to an embodiment, the second blending portion 340 may store the calculated second blending information in a buffer.

According to an embodiment, the second blending portion 340 may blend (or may perform an operation of blending) the second attribute images, at least partially based on the registered second attribute images and the second blending information. For example, the second blending portion 340 may blend the second attribute images at least partially based on values obtained by multiplying the values of the pixels of each of the second attribute images by the weights of the pixels of each of the second attribute images. For example, values of the pixels of the blended images may correspond to the values obtained by multiplying the values of the pixels of each of the second attribute images by the weights of the pixels of each of the second attribute images.

According to an embodiment, the second blending portion 340 may post-process the blended second attribute images to generate a second image. For example, the second blending portion 340 may generate the second image by applying a processing algorithm for processing the blended first image set as a high-quality color image.

According to an embodiment, a component for performing the post-processing operation may be included in the processor 120 as a component separate from the second blending portion 340. According to an embodiment, the component for performing the post-processing operation may be performed by the component separate from (or in addition to) the processor 120. According to an embodiment, the post-processing operation may be repeatedly performed by the separate component. For example, after the processor 120 performs the post-processing, the component separate from the processor 120 may perform again the post-processing.

According to an embodiment, the processor 120 may store the post-processed second image in the memory 130.

Figure 5:
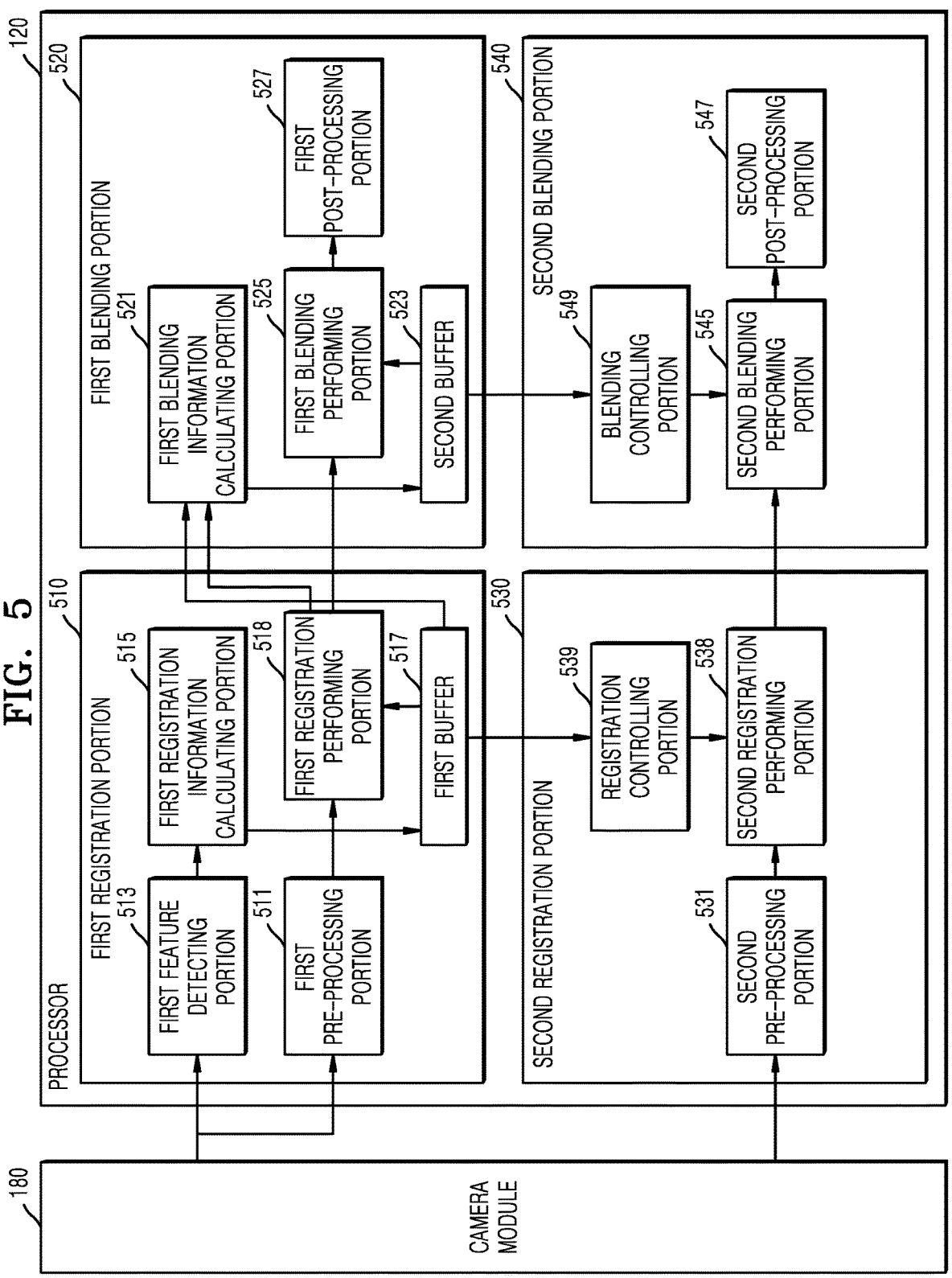
FIG. 5 is a block diagram for describing a device for providing an image, according to an example embodiment.

FIG. 5 is a block diagram for describing a device for providing an image according to an example embodiment.

Referring to FIG. 5, the processor 120 may include a first registration portion 510, a first blending portion 520, a second registration portion 530, and a second blending portion 540.

According to an embodiment, the first registration portion 510 may include a first pre-processing portion 511, a first feature detecting portion 513, a first registration information calculating portion 515, a first buffer 517, and a first registration performing portion 518.

According to an embodiment, the first pre-processing portion 511 may pre-process the first image set obtained from the camera module 180. For example, the first pre-processing portion 511 may correct the first image set by using an image processing algorithm for correcting an optical defect of the camera module 180 or a defect of manufacture. However, the defect corrected by the pre-processing is not limited thereto. According to an embodiment, the pre-processing operation performed by the first pre-processing portion 511 may be omitted. According to an embodiment, the first pre-processing portion 511 may be included in the processor 120 as a component separate from the first registration portion 510.

According to an embodiment, the first feature detecting portion 513 may detect (or extract) an attribute of each of images included in the first image set. For example, the first feature detecting portion 513 may detect the attribute including at least one of a reference axis of each of the images included in the first image set, a location of an external object, and an edge location. However, the attribute detected by the first feature detecting portion 513 is not limited thereto.

According to an embodiment, the first registration information calculating portion 515 may calculate the first registration information at least partially based on the attribute detected by the first feature detecting portion 513. According to an embodiment, the first registration information may include information about a difference between an attribute of the first reference image frame and an attribute of the first rest image.

According to an embodiment, the processor 120 may designate an image obtained last, from among the images included in the first image set obtained from the camera module 180, as the reference image. However, the method of designating the reference image is not limited thereto. For example, the processor 120 may determine an image having a greatest resolution (or degree of resolution) (or having a lowest degree of blur or having a greatest contrast difference between an image area corresponding to an external object and a background area), from among the images included in the first image set obtained from the camera module 180, as the reference image. According to an embodiment, the operation of determining the reference image with respect to the images included in the first image set by the processor 120 may be performed between a time point in which the first feature detecting portion 513 obtains the first image set from the camera module 180 and a time point in which the first registration information calculating portion 515 calculates the first registration information.

According to an embodiment, the first registration information calculating portion 515 may store the first registration information in a first buffer 517.

According to an embodiment, the first registration performing portion 518 may register the first image set at least partially based on the first registration information and the pre-processed first image set. According to an embodiment, the first registration performing portion 518 may register the first rest image to correspond to (or overlap) the first reference image. For example, the first registration performing portion 518 may perform, at least partially based on a difference between the reference axis of the first reference image and the reference axis of the first rest image, at least one of transferring and rotation operations of a reference axis of the first rest image such that the reference axis corresponds to the reference axis of the first reference image.

According to an embodiment, the first blending portion 520 may include a first blending information calculating portion 521, a second buffer 523, a first blending performing portion 525, and a first post-processing portion 527.

According to an embodiment, the first blending information calculating portion 521 may calculate the first blending information at least partially based on the registered first image set and the first registration information. According to an embodiment, the first blending information calculating portion 521 may determine the first blending information as the first weight. According to an embodiment, the first blending information calculating portion 521 may determine the weight of each of the pixels of the images included in the first image set, at least partially based on the first registration information.

According to an embodiment, the method of calculating the first blending information via the first blending information calculating portion 521 is at least partially the same or substantially the same as the description of FIG. 3, and thus, its detailed description will be omitted.

According to an embodiment, the first blending information calculating portion 521 may store the calculated first blending information in the second buffer 523.

According to an embodiment, the first blending performing portion 525 may blend (or may perform an operation of blending) the first image set, at least partially based on the registered first image set and the first blending information obtained from the second buffer 523. For example, the first blending performing portion 525 may blend the first image set at least partially based on values obtained by multiplying the values of the pixels of each of the images included in the first image set by the weights of the pixels of each of the images included in the first image set. For example, values of the pixels of the blended images may correspond to the values obtained by multiplying the values of the pixels of each of the images included in the first image set by the weights of the pixels of each of the images included in the first image set.

According to an embodiment, the first post-processing portion 527 may post-process the blended first image set to generate a first image. For example, the first post-processing portion 527 may generate the first image by applying a processing algorithm for processing the blended first image set as a high-quality color image.

According to an embodiment, the first post-processing portion 527 may be included in the processor 120 as a component separate from the first blending portion 520. According to an embodiment, the first post-processing portion 527 may be formed to be separate from (or in addition to) the processor 120. According to an embodiment, the post-processing operation may be repeatedly performed by the component separate from the processor 120. For example, after the processor 120 performs the post-processing on the image, the component separate from the processor 120 may post-process again the image post-processed by the processor 120.

According to an embodiment, the second registration portion 530 may include a second pre-processing portion 531, a registration controlling portion 539, and a second registration performing portion 538.

According to an embodiment, the second pre-processing portion 531 may pre-process the second attribute images obtained from the camera module 180. According to an embodiment, the operation of pre-processing the second attribute images via the second pre-processing portion 531 may be at least partially the same or substantially the same as the operation of pre-processing the images included in the first image set via the first pre-processing portion 511, and thus, its detailed description will be omitted.

According to an embodiment, the registration controlling portion 539 may obtain the first registration information from the first buffer 517.

According to an embodiment, the registration controlling portion 539 may calculate (or determine) second registration information by using the obtained first registration information. According to an embodiment, the second registration information may include information about a difference between a feature of a second reference image from among the second attribute images and a feature of a second rest image.

According to an embodiment, the processor 120 may determine an image having a greatest resolution (or degree of resolution) (or having a lowest degree of blur or having a greatest contrast difference between an image area corresponding to an external object and a background area), from among the second attribute images obtained from the camera module 180, as the second reference image. According to an embodiment, the operation of determining the second reference image from among the second attribute images may be performed before the registration controlling portion 539 performs the operation of determining the second registration information.

According to another embodiment, the processor 120 may designate (or set) an image obtained last (or at a most recent point in time), from among the second attribute images obtained from the camera module 180, as the second reference image. However, the method of designating the reference image is not limited thereto.

According to an embodiment, the registration controlling portion 539 may determine at least one of whether the second reference image corresponds to the first reference image and whether a size of the images included in the first image set is equal to a size of the images included in the second attribute images.

According to an embodiment, when the registration controlling portion 539 determines that the second reference image corresponds to the first reference image and the size of the images included in the first image set is equal to the size of the images included in the second attribute images, the registration controlling portion 539 may determine the first registration information as the second registration information.

According to another embodiment, when the registration controlling portion 539 determines that the second reference image does not correspond to the first reference image, the registration controlling portion 539 may calculate the second registration information by changing the first registration information at least partially based on the second reference image.

According to another embodiment, when the registration controlling portion 539 determines that the size of the images included in the first image set is not equal to the size of the images included in the second attribute images, the registration controlling portion 539 may determine the second registration information by scaling or resizing the first registration information.

According to another embodiment, when the registration controlling portion 539 determines that the second reference image does not correspond to the first reference image and the size of the images included in the first image set is not equal to the size of the images included in the second attribute images, the registration controlling portion 539 may determine the second registration information by changing the first registration information at least partially based on the second reference image and scaling the changed first registration information.

According to an embodiment, the second registration performing portion 538 may register the second attribute images at least partially based on the second registration information and the pre-processed second attribute images. According to an embodiment, the second registration performing portion 538 may register the second rest image to correspond to (or overlap) the second reference image. For example, the second registration performing portion 538 may perform at least one of operations of transferring and rotating the reference axis of the second rest image to correspond to the reference axis of the second reference image at least partially based on a difference between the reference axis of the second reference image and the reference axis of the second rest image.

According to an embodiment, the second blending portion 540 may include a blending controlling portion 549, a second blending performing portion 545, and a second post-processing portion 547.

According to an embodiment, the blending controlling portion 549 may calculate second blending information by using first blending information obtained from the second buffer 523.

According to an embodiment, the blending controlling portion 549 may determine at least one of whether the second reference image corresponds to the first reference image and whether a size of the images included in the first image set is equal to a size of the images included in the second attribute images.

According to an embodiment, when the blending controlling portion 549 determines that the second reference image corresponds to the first reference image and the size of the images included in the first image set is equal to the size of the images included in the second attribute images, the blending controlling portion 549 may determine the first blending information to be the second blending information.

According to another embodiment, when the second reference image does not correspond to the first reference image, the blending controlling portion 549 may calculate the second blending information by changing the first blending information to correspond to the second reference image. The operation of calculating the second blending information by changing the first blending information based on the second reference image, via the blending controlling portion 549, is at least partially the same or substantially the same as the method of calculating the second blending information by using Equations 4 to 6, via the second blending portion 540 of FIG. 3, and thus, its detailed description will be omitted.

According to an embodiment, when a size of the images included in the first image set is not equal to a size of the images included in the second attribute images, the blending controlling portion 549 may calculate the weights of the pixels to correspond to the sizes of the second attribute images by using interpolation. The method of calculating the weights of the pixels by using the interpolation via the blending controlling portion 549 is at least partially the same or substantially the same as the method of calculating the weights of the pixels by using the interpolation via the second blending portion 540 of FIG. 3, and thus, its detailed description will be omitted.

According to an embodiment, when the second reference image does not correspond to the first reference image and the size of the images included in the first image set is not equal to the size of the images included in the second attribute images, the blending controlling portion 549 may calculate the second blending information by calculating the weights of the pixels to correspond to the second reference image and applying the interpolation to the calculated weights of the pixels.

According to an embodiment, the blending controlling portion 549 may generate a blending map with respect to each of the second reference image and the second rest image at least partially based on the weights of the pixels of the second reference image and the weights of the pixels of the second rest image.

According to an embodiment, the second blending performing portion 545 may blend the second attribute images at least partially based on the registered second attribute images and the second blending information. For example, the second blending performing portion 545 may blend the second attribute images, at least partially based on values obtained by multiplying the values of the pixels of each of the second attribute images by the weights of the pixels of each of the second attribute images. For example, values of the pixels of the blended images may correspond to the values obtained by multiplying the values of the pixels of each of the second attribute images by the weights of the pixels of each of the second attribute images.

According to an embodiment, the second post-processing portion 547 may post-process the blended second attribute images to generate a second image. For example, the second post-processing portion 547 may generate the second image by applying a processing algorithm for processing the blended first image set as a high-quality color image.

According to an embodiment, the second post-processing portion 547 may be included in the processor 120 as a component separate from the second blending portion 540. According to an embodiment, the second post-processing portion 547 may be performed by the component separate from (or in addition to) the processor 120. According to an embodiment, the post-processing operation may be repeatedly performed by the separate component. For example, after the processor 120 performs the post-processing, the component separate from the processor 120 may perform again the post-processing.

According to an embodiment, the processor 120 may store the post-processed second image in the memory 130.

Figure 6:
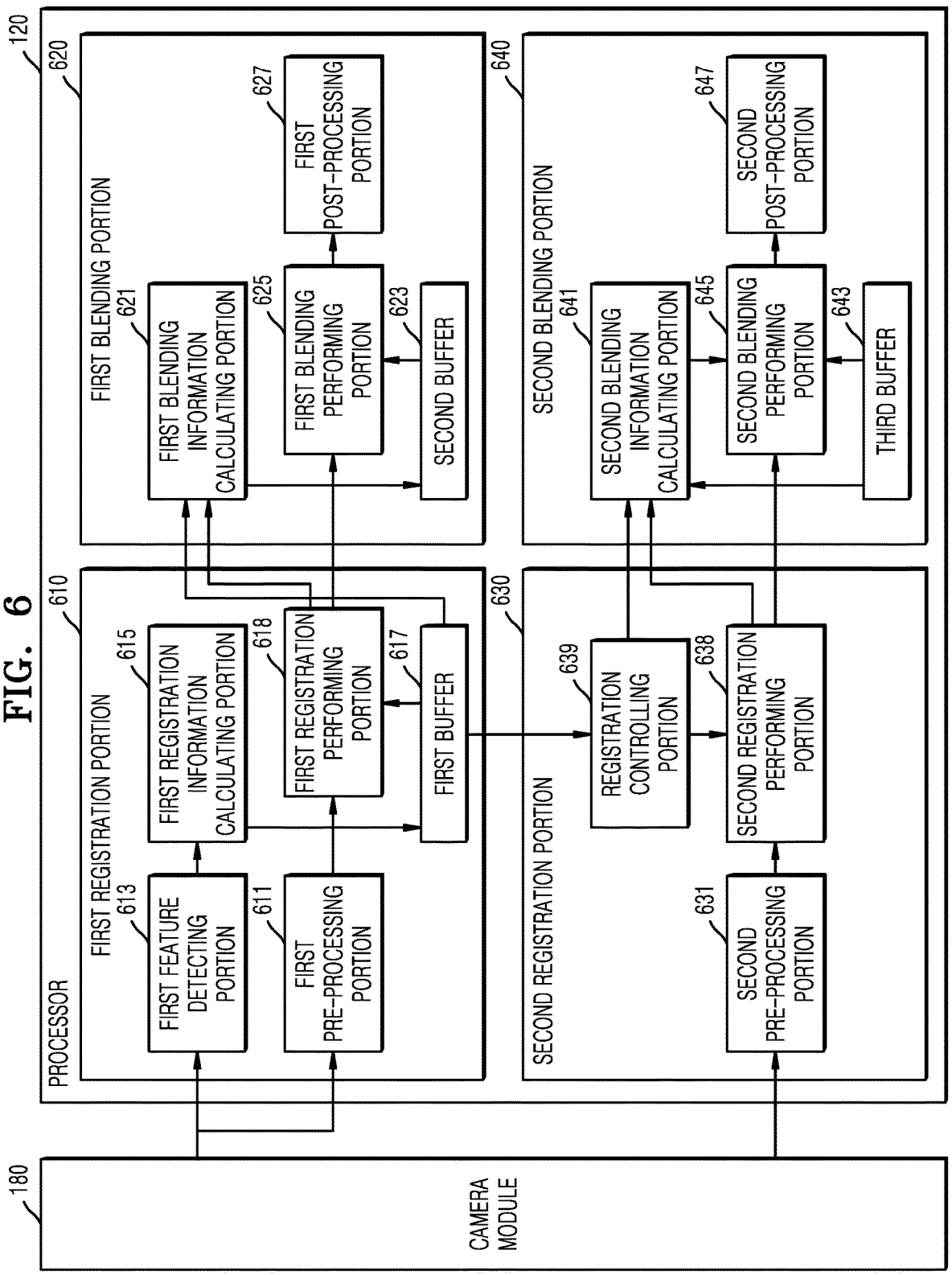
FIG. 6 is a block diagram for describing a device for providing an image, according to an example embodiment.

FIG. 6 is a block diagram for describing a device for providing an image according to an example embodiment.

Referring to FIG. 6, the processor 120 may include a first registration portion 610, a first blending portion 620, a second registration portion 630, and a second blending portion 640.

According to an embodiment, the first registration portion 610 may include a first pre-processing portion 611, a first feature detecting portion 613, a first registration information calculating portion 615, a first buffer 617, and a first registration performing portion 618.

According to an embodiment, the first blending portion 620 may include a first blending information calculating portion 621, a second buffer 623, a first blending performing portion 625, and a first post-processing portion 627.

According to an embodiment, the second registration portion 630 may include a second pre-processing portion 631, a registration controlling portion 639, and a second registration performing portion 638.

The first registration portion 610, the first blending portion 620, and the second registration portion 630 of FIG. 6 may at least partially perform the same or substantially the same as the first registration portion 510, the first blending portion 520, and the second registration portion 530 of FIG. 5, and thus, their detailed descriptions will be omitted.

According to an embodiment, the second blending portion 640 may include a second blending information calculating portion 641, a third buffer 643, a second blending performing portion 645, and a second post-processing portion 647.

According to an embodiment, the second blending information calculating portion 641 may obtain the second registration information from the registration controlling portion 639 and second attribute images registered by the second registration performing portion 638.

According to an embodiment, the second blending information calculating portion 641 may calculate the second blending information at least partially based on the obtained second registration information and the registered second attribute images.

According to an embodiment, the second blending information calculating portion 641 may calculate the second weight by using the second blending information. According to an embodiment, the second blending information calculating portion 641 may determine the weight with respect to each of pixels of images included in the second attribute images, at least partially based on the second registration information. The operation of determining the second weight will be described with reference to the equations below.

$$W_{pix} = W_{Gi} \times W_{Lo} \quad \text{[Equation 8]}$$

$$W_{Gi} = [\text{frame}_{ref} - \text{frame}_{non}]_{Nor} \times [Rot_{ref} - Rot_{non}]_{Nor} \times [\text{Tran}_{ref} - \text{Trans}_{non}]_{Nor} \quad \text{[Equation 9]}$$

$$W_{Lo} = [D_{(non,\ ref)}]_{Nor},\ D_{(non,\ ref)} = Pix_{non} - Pix_{ref} \quad \text{[Equation 10]}$$

In the equations above, $W_{pix}$ (a weight of each of pixels of the second rest image) may denote a weight of each of the pixels of the second rest image, $W_{Gl}$ (a global weight of the second rest image) may denote a weight calculated based on a difference between the second reference image and the second rest image, and $W_{Lo}$ (a local weight of the second rest image) may denote a weight calculated based on a difference (e.g., a brightness difference, a color difference, a chromatic difference, or a combination thereof) between the values of the pixels of the second rest image and the values of the pixels of the second reference image.

According to an embodiment, the weights of the pixels of the second rest image may be calculated by multiplying the global weight of the second rest image by the local weight of the second rest image.

According to an embodiment, the global weight of the second rest image may be calculated by multiplying a value [frame$_{ref}$–frame$_{non}$]$_{Nor}$ obtained by normalizing a distance difference between the second reference image frame frame$_{ref}$ and the second rest image frame frame$_{non}$ by: (1) a value [Rot$_{ref}$–Rot$_{non}$]$_{Nor}$ obtained by normalizing an angle difference (or an angle by which the reference axis of the second rest image is rotated to correspond to the reference axis of the second reference image) between the reference axis of the second reference image and the reference axis of the second rest image and (2) a value [Tran$_{ref}$–Trans$_{non}$]$_{Nor}$ obtained by normalizing a location (coordinate) difference (or a value of a coordinate to which the reference axis of the second rest image is transferred, in order to correspond to the reference axis of the second reference image in the registration operation) between the reference axis of the second reference image and the reference axis of the second rest image.

According to an embodiment, the local weight of the second reference image may be calculated as a value [D$_{(non, ref)}$]$_{Nor}$ obtained by normalizing a difference D$_{(non, ref)}$=Pix$_{non}$–Pix$_{ref}$ between values of the pixels of the second rest image and values of the pixels of the first reference image, where the pixels of the first reference image are at coordinates corresponding to coordinates of the pixels of the second rest image.

However, the method of calculating the weights of pixels of the second rest image is not limited thereto and may include various methods.

According to an embodiment, the weights of pixels of the second reference image may be determined to be greater than the weights of pixels of the second rest image.

According to an embodiment, the second blending information calculating portion 641 may generate a blending map with respect to each of the second reference image and the second rest image at least partially based on the weights of pixels of the second reference image and the weights of pixels of the second rest image.

According to an embodiment, the third buffer 643 may store the calculated first blending information.

According to an embodiment, the second blending performing portion 645 may blend the second attribute images at least partially based on the registered second attribute images and the second blending information. For example, the second blending performing portion 645 may blend the second attribute images, at least partially based on values obtained by multiplying the values of the pixels of each of the second attribute images by the weights of the pixels of each of the second attribute images. For example, values of the pixels of the blended images may correspond to the values obtained by multiplying the values of the pixels of each of the images included in the first image set by the weights of the pixels of each of the images included in the first image set.

According to an embodiment, the operation performed by the second post-processing portion 647 may be at least partially the same or substantially the same as the operation performed by the first post-processing portion 527 of FIG. 5, and thus, its detailed description will be omitted.

Figure 7:
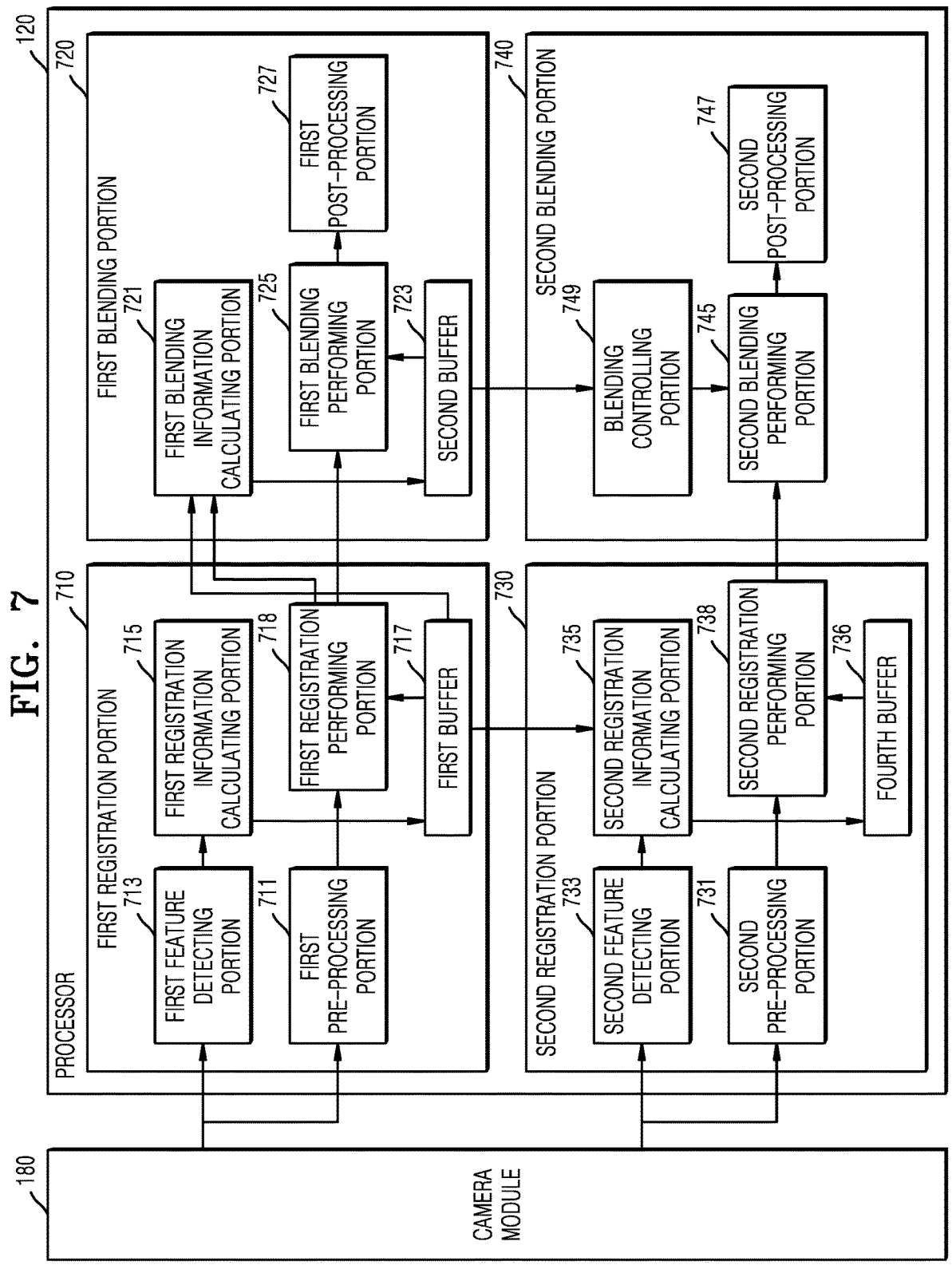
FIG. 7 is a block diagram for describing a device for providing an image, according to an example embodiment.

FIG. 7 is a block diagram for describing a device for providing an image according to an example embodiment.

Referring to FIG. 7, the processor 120 may include a first registration portion 710, a first blending portion 720, a second registration portion 30, and a second blending portion 740. The first registration portion 710 may include a first pre-processing portion 711, a first feature detecting portion 713, a first registration information calculating portion 715, a first buffer 717, and a first registration performing portion 718.

According to an embodiment, the first blending portion 720 may include a first blending information calculating portion 721, a second buffer 723, a first blending performing portion 725, and a first post-processing portion 727.

The first registration portion 710 and the first blending portion 720 of FIG. 7 may perform at least partially the same or substantially the same operations as the first registration portion 510 and the first blending portion 520 of FIG. 5, and thus, their detailed descriptions will be omitted.

According to an embodiment, the second registration portion 730 may include a second pre-processing portion 731, a second feature detecting portion 733, a second registration information calculating portion 735, a fourth buffer 736, and a second registration performing portion 738.

According to an embodiment, the second pre-processing portion 731 may pre-process second attribute images obtained from the camera module 180.

According to an embodiment, the second feature detecting portion 733 may detect (or extract) a feature of each of the second attribute images. For example, the second feature detecting portion 733 may detect a feature including at least one of a reference axis of each of the second attribute images, a location of an external object, and an edge location. However, the feature detected by the second feature detecting portion 733 is not limited thereto.

According to an embodiment, the second registration information calculating portion 735 may calculate the second registration information at least partially based on the feature detected by the second feature detecting portion 733. According to an embodiment, the second registration information may include information about a difference between the feature of the second reference image and the feature of the second rest image.

According to an embodiment, the second registration information calculating portion 735 may store the second registration information in the fourth buffer 736.

According to an embodiment, the second registration performing portion 738 may register the second attribute images at least partially based on the second registration information and the pre-processed second attribute images. According to an embodiment, the second registration performing portion may register the second rest image to correspond to (or overlap) the second reference image. For example, the second registration performing portion 738 may perform at least one of transferring and rotating a reference axis of the first rest image to correspond to a reference axis of the second reference image, at least partially based on a difference between the reference axis of the second reference image and the reference axis of the second rest image.

According to an embodiment, the second blending portion 740 may include a blending controlling portion 749, a second blending performing portion 745, and a second post-processing portion 747.

According to an embodiment, the blending controlling portion 749 may obtain first blending information from the second buffer 723.

According to an embodiment, the blending controlling portion 749 may calculate second blending information at least partially based on the first blending information.

According to an embodiment, the blending controlling portion 749 may determine the second weight based on the second blending information.

According to an embodiment, the blending controlling portion 749 may determine at least one of whether the second reference image corresponds to the first reference image, whether the number of images included in the first image set is equal to the number of second attribute images, and whether a size of the images included in the first image set is equal to a size of the images included in the second attribute images.

According to an embodiment, when: (1) the second reference image corresponds to the first reference image, (2) the number of images included in the first image set is equal to the number of second attribute images, and (3) the size of the images included in the first image set is equal to the images included in the second attribute images, the blending controlling portion 749 may determine the first blending information as the second blending information.

According to an embodiment, when the second reference image does not correspond to the first reference image, the blending controlling portion 749 may calculate the second blending information by changing the first blending information to correspond to the second reference image. For example, the blending controlling portion 749 may calculate the second blending information by using Equations 4 to 6.

According to an embodiment, when the number of images included in the first image set is not equal to the number of second attribute images, the blending controlling portion 749 may calculate the second blending information by changing the first blending information to correspond to the number of second attribute images. According to an embodiment, when the number of images included in the first image set is not equal to the number of second attribute images, the blending controlling portion 749 may calculate the second blending information by using extrapolation.

According to an embodiment, when the size of the images included in the first image set is not equal to the size of the images included in the second attribute images, the blending controlling portion 749 may calculate the weights of the pixels to correspond to the size of the second attribute images by using interpolation.

According to an embodiment, when the second reference image does not correspond to the first reference image and the size of the images included in the first image set is not equal to the size of the images included in the second attribute images, the blending controlling portion 749 may calculate the second blending information by calculating the weights of the pixels to correspond to the second reference image and applying interpolation with respect to the calculated weights of the pixels.

According to an embodiment, when the number of images included in the first image set is not equal to the number of second attribute images and the size of the images included in the first image set is not equal to the size of the images included in the second attribute images, the blending controlling portion 749 may calculate the second blending information by applying extrapolation and interpolation with respect to the first weight. According to an embodiment, the second blending portion 740 may calculate the second blending information by applying interpolation with respect to the weights of the pixels calculated by applying extrapolation with respect to the first weight or by applying extrapolation with respect to the weights of the pixels calculated by applying interpolation with respect to the first weight.

According to an embodiment, when: (1) the second reference image does not correspond to the first reference image, (2) the size of the images included in the first image set is not equal to the size of the images included in the second attribute images, and (3) the number of images included in the first image set is not equal to the number of second attribute images, the blending controlling portion 749 may calculate the second blending information by calculating the weights of the pixels to correspond to the second reference image and applying extrapolation and interpolation with respect to the calculated weights of the pixels.

According to an embodiment, the blending controlling portion 749 may generate a blending map with respect to each of the second reference image and the second rest image at least partially based on the weights of the pixels of the second reference image and the weights of the pixels of the second rest image.

According to an embodiment, the second blending performing portion 745 may blend the second attribute images at least partially based on the registered second attribute images and the second blending information. For example, the second blending performing portion 745 may blend the second attribute images, at least partially based on values obtained by multiplying the values of the pixels of each of the second attribute images by the weights of the pixels of each of the second attribute images. For example, values of the pixels of the blended images may correspond to the values obtained by multiplying the values of the pixels of each of the second attribute images by the weights of the pixels of each of the second attribute images.

According to an embodiment, the second post-processing portion 747 may post-process the blended second attribute images to generate a second image.

According to an embodiment, the processor 120 may store the post-processed second image in the memory 130.

Electronic devices according to embodiments may include a camera, a memory, and a processor. The processor may be configured to generate at least one first image by obtaining a plurality of images having a first attribute with respect to an external object, by using the camera, and correcting images included in a first image set from among the plurality of images during at least a portion of the operation of obtaining the plurality of images. The processor may display the generated at least one first image. Also, the processor may store at least one second image generated by obtaining a plurality of images having a second attribute with respect to the external object, based on reception of a signal corresponding to an image capture with respect to the external object during at least a portion of the operation of obtaining the plurality of images. And the processor may correct the plurality of images having the second attribute based on the first image set.

According to embodiments, when the processor is configured to generate the at least one first image, the processor may further be configured to register the at least one first image, from among the images included in the first image set, at least partially based on comparison of the at least one first image with a first reference image, from among the images included in the first image set. The processor may generate the at least one first image that is corrected by blending the registered at least one first image with the first reference image.

According to embodiments, when the processor is configured to register the at least one first image, the processor may further be configured to determine first registration information for registering the at least one first image. And when the processor is configured to generate the at least one first image, the processor may further be configured to determine first blending information for blending the registered at least one first image with the first reference image.

According to embodiments, when the processor is configured to store the at least one second image, the processor may further be configured to register the at least one second image, from among the plurality of images having the second attribute, at least partially based on comparison of the at least one second image with a second reference image, from among the plurality of images having the second attribute. The processor may generate the at least one second image that is corrected by blending the registered at least one second image with the second reference image.

According to embodiments, when the processor is configured to register the at least one second image, the processor may further be configured to determine second registration information for registering the at least one second image at least partially based on the first registration information.

According to embodiments, the processor may further be configured to perform at least one of: (1) an operation of changing the first registration information, such that the first registration information corresponds to the second reference image, when the second reference image does not correspond to the first reference image and (2) an operation of scaling the first registration information when a size of each of the images included in the first image set is not equal to a size of each of the plurality of images having the second attribute.

According to embodiments, when the processor is configured to blend the registered at least one second image with the second reference image, the processor may further be configured to determine second blending information for blending the registered at least one second image with the second reference image at least partially based on the first blending information.

According to embodiments, the processor may further be configured to determine the second blending information by performing at least one of: (1) an operation of changing the first blending information, such that the first blending information corresponds to the second reference image, when the second reference image does not correspond to the first reference image, (2) an operation of applying extrapolation when the number of images having the second attribute is greater than the number of images included in the first image set, and (3) an operation of applying interpolation when a size of each of the images included in the first image set is less than a size of each of the plurality of images having the second attribute.

According to embodiments, the processor may further be configured to display the generated at least one first image as a preview image.

According to embodiments, a size of each of the images included in the first image set may not be equal to a size of each of the plurality of images having the second attribute.

Figure 8:
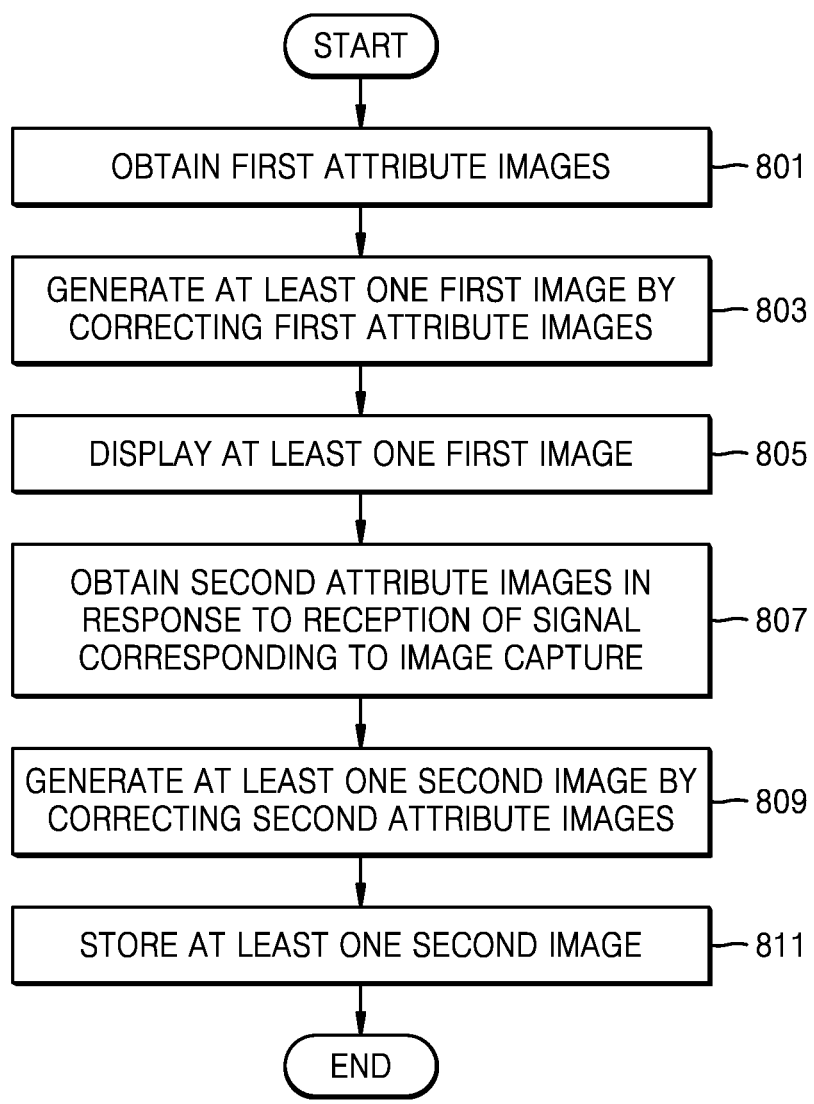
FIG. 8 is a general flowchart for describing a method of providing an image, according to embodiments.

FIG. 8 is an overall flowchart of a method of providing an image, according to embodiments.

Referring to FIG. 8, in operation 801, the processor 120 (e.g., the first registration portion 310) may obtain first attribute images from the camera module 180.

According to an embodiment, a size (or a data capacity) of each of the first attribute images (or a first image set) may be less than a size of each of second attribute images. For example, the first attribute images may be generated by converting images obtained by the processor 120 from the image sensor 230 into smaller sizes. However, it is not limited thereto.

In operation 803, the processor 120 may generate at least one first image by correcting the first attribute images.

According to an embodiment, the processor 120 (e.g., the first registration portion 310) may pre-process the first image set obtained from the camera module 180.

According to an embodiment, the processor 120 (e.g., the first registration portion 310) may detect (or extract) a feature of each of the images included in the first image set. For example, the processor 120 (e.g., the first registration portion 310) may detect a feature including at least one of a reference axis of each of the images included in the first image set, a location of an external object, and a location of an edge. However, the feature detected by the processor 120 is not limited to the examples described above.

According to an embodiment, the processor 120 (e.g., the first registration portion 310) may calculate the first registration information at least partially based on the detected feature.

According to an embodiment, the processor 120 may designate an image obtained last (or at a most recent point in time), from among the images included in the first image set obtained from the camera module 180, as the reference image. However, the method of designating the reference image is not limited thereto. For example, the processor 120 may determine an image having a greatest resolution (or degree of resolution) (or having a lowest degree of blur or having a greatest contrast difference between an image area corresponding to an external object and a background area), from among the images included in the first image set obtained from the camera module 180, as the reference image.

According to an embodiment, the processor 120 (e.g., the first registration portion 310) may store the first registration information in a buffer (or a memory).

According to an embodiment, the processor 120 (e.g., the first registration portion 310) may register the first image set at least partially based on the first registration information and the pre-processed first image set. According to an embodiment, the processor 120 (e.g., the first registration portion 310) may register the first rest image to correspond to (or overlap) the first reference image. For example, the processor 120 (the first registration portion 310) may perform, at least partially based on a difference between the reference axis of the first reference image and the reference axis of the first rest image, at least one of transferring and rotation operations of a reference axis of the first rest image such that the reference axis corresponds to the reference axis of the first reference image.

According to an embodiment, the processor 120 (e.g., the first blending portion 320) may calculate the first blending information at least partially based on the registered first image set and the first registration information.

The method of calculating the first blending information via the first processor 120 (e.g., the first blending portion 320) is at least partially the same or substantially the same as the method of calculating the first blending information via the first blending portion of FIG. 3, and thus, its detailed description will be omitted.

According to an embodiment, the first processor 120 (e.g., the first blending portion 320) may store the calculated first blending information in a buffer.

According to an embodiment, the first processor 120 (e.g., the first blending portion 320) may blend the first image set at least partially based on the registered first image set and the first blending information. For example, the processor 120 (e.g., the first blending portion 320) may blend the first image set at least partially based on values obtained by multiplying the values of the pixels of each of the images included in the first image set by the weights of the pixels of each of the images included in the first image set. For example, values of the pixels of the blended images may correspond to the values obtained by multiplying the values of the pixels of each of the images included in the first image set by the weights of the pixels of each of the images included in the first image set.

According to an embodiment, the first processor 120 (e.g., the first blending portion 320) may generate a first image by post-processing the blended first image set.

In operation 805, the processor 120 may display at least one first image. According to an embodiment, the processor 120 may control the display device 160 to display the first image. According to an embodiment, the first image may be a preview image output in real time or a video image stored after being output.

In operation 807, the processor 120 (e.g., the second registration portion 330) may obtain second attribute images from the camera module 180 based on reception of a signal corresponding to an image capture with respect to an external object, while obtaining the first attribute images. According to an embodiment, at least one or more of the second attribute images may correspond to the first image set. For example, when the image sensor 230 generates original images for a first hour, the: (1) first image set may correspond to images generated by the image signal processor 260 by processing the original images generated for the first hour so as to have a first attribute and (2) second attribute images may correspond to images (or the original images on which the processing operation is not performed by the image signal processor 260) generated by the image signal processor 260 by processing the original images generated for the first hour so as to have a second attribute. According to an embodiment, the second attribute images may be images, which are obtained by the image signal processor 260 from the image sensor 230 and are not converted into smaller sizes. According to an embodiment, when the first image set includes: (1) the first image frame having the first attribute obtained by the processor 120 (e.g., the first registration portion 310) from the camera module 180 at a first time point in which the signal corresponding to the image capture of the external object is received and (2) the second image frame having the first attribute obtained by the processor 120 (e.g., the first registration portion 310) from the camera module 180 at a second time point, which is directly previous to the first time point, the second attribute images may include: (a) the third image frame having the second attribute obtained by the processor 120 (e.g., the second registration portion 330) from the camera module 180 at the first time point and (b) the fourth image frame having the second attribute obtained by the processor 120 (the second registration portion 330) from the camera module 180 at the second time point. However, the disclosure is not limited thereto, and the second attribute images may further include an image (e.g., an image frame obtained at a time point that is directly previous to the second time point), in addition to the images corresponding to the first image set, or may not include at least one of the images corresponding to the first image set.

In operation 809, the processor 120 (e.g., the second registration portion 330) may generate at least one second image by correcting the second attribute images.

According to an embodiment, the processor 120 (e.g., the second registration portion 330) may pre-process the second attribute images obtained from the camera module 180.

According to an embodiment, the processor 120 (e.g., the second registration portion 330) may register the second attribute images at least partially based on the first registration information. According to an embodiment, the processor 120 (e.g., the second registration portion 330) may calculate (or determine) the second registration information by using the first registration information. According to an embodiment, the second registration information may include information about a difference between a feature of the second reference image, from among the second attribute images, and a feature of the second rest image except for the second reference image.

According to an embodiment, the processor 120 may determine an image having the highest resolution from among the second attribute images obtained from the camera module 180 as the second reference image.

According to another embodiment, the processor 120 may designate (or set) the image obtained, from among the second attribute images, last (or at a most recent point in time) as the reference image. However, the method of designating the reference image is not limited thereto.

According to an embodiment, the processor 120 (e.g., the second registration portion 330) may determine at least one of whether the second reference image corresponds to the first reference image and whether a size of the images included in the first image set is equal to a size of the images included in the second attribute images.

According to an embodiment, when the processor 120 (e.g., the second registration portion 330) determines that the second reference image corresponds to the first reference image and the size of the images included in the first image set is equal to the size of the images included in the second attribute images, the processor 120 (e.g., the second registration portion 330) may determine the first registration information as the second registration information.

According to another embodiment, when the processor 120 (e.g., the second registration portion 330) determines that the second reference image does not correspond to the first reference image, the processor 120 (e.g., the second registration portion 330) may calculate the second registration information by changing the first registration information at least partially based on the second reference image.

According to another embodiment, when the processor 120 (e.g., the second registration portion 330) determines that the size of the images included in the first image set is not equal to the size of the images included in the second attribute images, the processor 120 (e.g., the second registration portion 330) may determine the second registration information by scaling the first registration information.

According to another embodiment, when the processor 120 (e.g., the second registration portion 330) determines that the second reference image does not correspond to the first reference image and the size of the images included in the first image set is not equal to the size of the images included in the second attribute images, the processor 120 (e.g., the second registration portion 330) may determine the second registration information by changing and scaling (or resizing) the first registration information at least partially based on the second reference image.

According to an embodiment, the processor 120 (e.g., the second registration portion 330) may calculate the second registration information without being based on the first registration information. For example, the processor 120 (e.g., the second registration portion 330) may detect (or extract) a feature of each of the second attribute images. The processor 120 (e.g., the second registration portion 330) may calculate the second registration information by calculating a difference between the detected features of the second attribute images.

According to an embodiment, the processor 120 (e.g., the second registration portion 330) may register the second attribute images at least partially based on the second registration information and the pre-processed second attribute images. According to an embodiment, the processor 120 (e.g., the second registration portion 330) may register the second rest image to correspond to (or overlap) the second reference image. For example, the processor 120 (e.g., the second registration portion 330) may perform at least one of transferring and rotating the reference axis of the second rest image to correspond to the reference axis of the second reference image at least partially based on a difference between the reference axis of the second reference image and the reference axis of the second rest image.

According to an embodiment, the processor 120 (e.g., the second blending portion 340) may determine the second blending information at least partially based on the registered second attribute images and the first blending information. According to an embodiment, the processor 120 (e.g., the second blending portion 340) may calculate (or determine) the second blending information by using the first blending information without calculating the blending information at least partially based on the registered second attribute images and the second registration information.

According to an embodiment, the processor 120 (e.g., the second blending portion 340) may determine at least one of whether the second reference image corresponds to the first reference image, whether the number of images included in the first image set is equal to the number of second attribute images, and a size of the images included in the first image set is equal to a size of the images included in the second attribute images.

According to an embodiment, when: (1) the second reference image corresponds to the first reference image, (2) the number of images included in the first image set is equal to the number of second attribute images, and (3) the size of the images included in the first image set is equal to the size of the images included in the second attribute images, the processor 120 (e.g., the second blending portion 340) may determine the first blending information as the second blending information.

According to an embodiment, when the second reference image does not correspond to the first reference image, the processor 120 (e.g., the second blending portion 340) may calculate the second blending information by changing the first blending information to correspond to (or based on, or adaptively to) the second reference image.

According to an embodiment, when the number of images included in the first image set is not equal to the number of second attribute images, the processor 120 (e.g., the second blending portion 340) may calculate the second blending information by changing the first blending information to correspond to the number of second attribute images. According to an embodiment, when the number of images included in the first image set is not equal to the number of second attribute images, the processor 120 (e.g., the second blending portion 340) may calculate the second blending information by using extrapolation.

According to an embodiment, when the size of the images included in the first image set is not equal to the size of the images included in the second attribute images, the processor 120 (e.g., the second blending portion 340) may calculate weights of the pixels to correspond to the size of the second attribute images by using interpolation. According to an embodiment, when the number of pixels of the images included in the first image set is less than the number of pixels of the images included in the second attribute images, the processor 120 (e.g., the second blending portion 340) may calculate weights of the pixels of the images included in the second attribute images by applying interpolation with respect to the weights of the pixels of the images included in the second attribute images. The pixels of the images included in the second attribute images are at coordinates other than coordinates of the pixels of the images included in the second attribute images. The coordinates of the pixels of the images included in the second attribute images correspond to coordinates of the pixels of the images included in the first image set. The pixels of the images included in the second attribute images are at coordinates corresponding to the coordinates of the pixels of the images included in the first image set.

According to an embodiment, the applied interpolation may include bi-linear interpolation, bi-cubic interpolation, a low pass filter, an edge detection filter, or the like. However, it is not limited thereto.

According to an embodiment, when the second reference image does not correspond to the first reference image and the number of images included in the first image set is not equal to the number of second attribute images, the processor 120 (e.g., the second blending portion 340) may calculate the second blending information by calculating weights of the pixels to correspond to the second reference image and applying extrapolation with respect to the calculated weights of the pixels.

According to an embodiment, when the second reference image does not correspond to the first reference image and the size of the images included in the first image set is not equal to the size of the images included in the second attribute images, the processor 120 (the second blending portion 340) may calculate the second blending information by calculating weights of the pixels to correspond to the second reference image and applying interpolation with respect to the calculated weights of the pixels.

According to an embodiment, when the number of images included in the first image set is not equal to the number of second attribute images and a size of the images included in the first image set is not equal to a size of the images included in the second attribute images, the processor 120 (e.g., the second blending portion 340) may calculate the second blending information by applying extrapolation and interpolation with respect to the first weight. According to an embodiment, the processor 120 (e.g., the second blending portion 340) may calculate the second blending information by applying the interpolation with respect to the calculated weights of the pixels after applying the extrapolation with respect to the first weight or applying the extrapolation with respect to the calculated weights of the pixels after applying the interpolation with respect to the first weight.

According to an embodiment, when: (1) the second reference image does not correspond to the first reference image, (2) the size of the images included in the first image set is not equal to the size of the images included in the second attribute images, and (3) the number of images included in the first image set is not equal to the number of second attribute images, the processor 120 (e.g., the second blending portion 340) may calculate the second blending information by calculating the weights of the pixels to correspond to the second reference image and applying extrapolation and interpolation with respect to the calculated weights of the pixels.

According to an embodiment, the processor 120 (e.g., the second blending portion 340) may calculate the second blending information at least partially based on the registered second attribute images and the second registration information without using the first blending information.

According to an embodiment, the method of calculating the second blending information is not limited to the example described above and may include various methods.

According to an embodiment, the processor 120 (e.g., the second blending portion 340) may generate a blending map with respect to each of the second reference image and the second rest image at least partially based on the weights of the pixels of the second reference image and weights of the pixels of the second rest image.

According to an embodiment, the processor 120 (e.g., the second blending portion 340) may store the calculated second blending information in a buffer.

According to an embodiment, the processor 120 (e.g., the second blending portion 340) may blend (or perform an operation of blending) the second attribute images at least partially based on the registered second attribute images and the second blending information. For example, the processor 120 (e.g., the second blending portion 340) may blend the second attribute images at least partially based on values obtained by multiplying values of pixels of each of the second attribute images by weights of the pixels of each of the second attribute images. For example, values of pixels of the blending image may correspond to the values obtained by multiplying the values of the pixels of each of the second attribute images by the weights of the pixels of each of the second attribute images.

According to an embodiment, the processor 120 (e.g., the second blending portion 340) may generate at least one second image by post-processing the blended second attribute images.

In operation 811, the processor 120 may store the generated at least one second image.

Figure 9A:
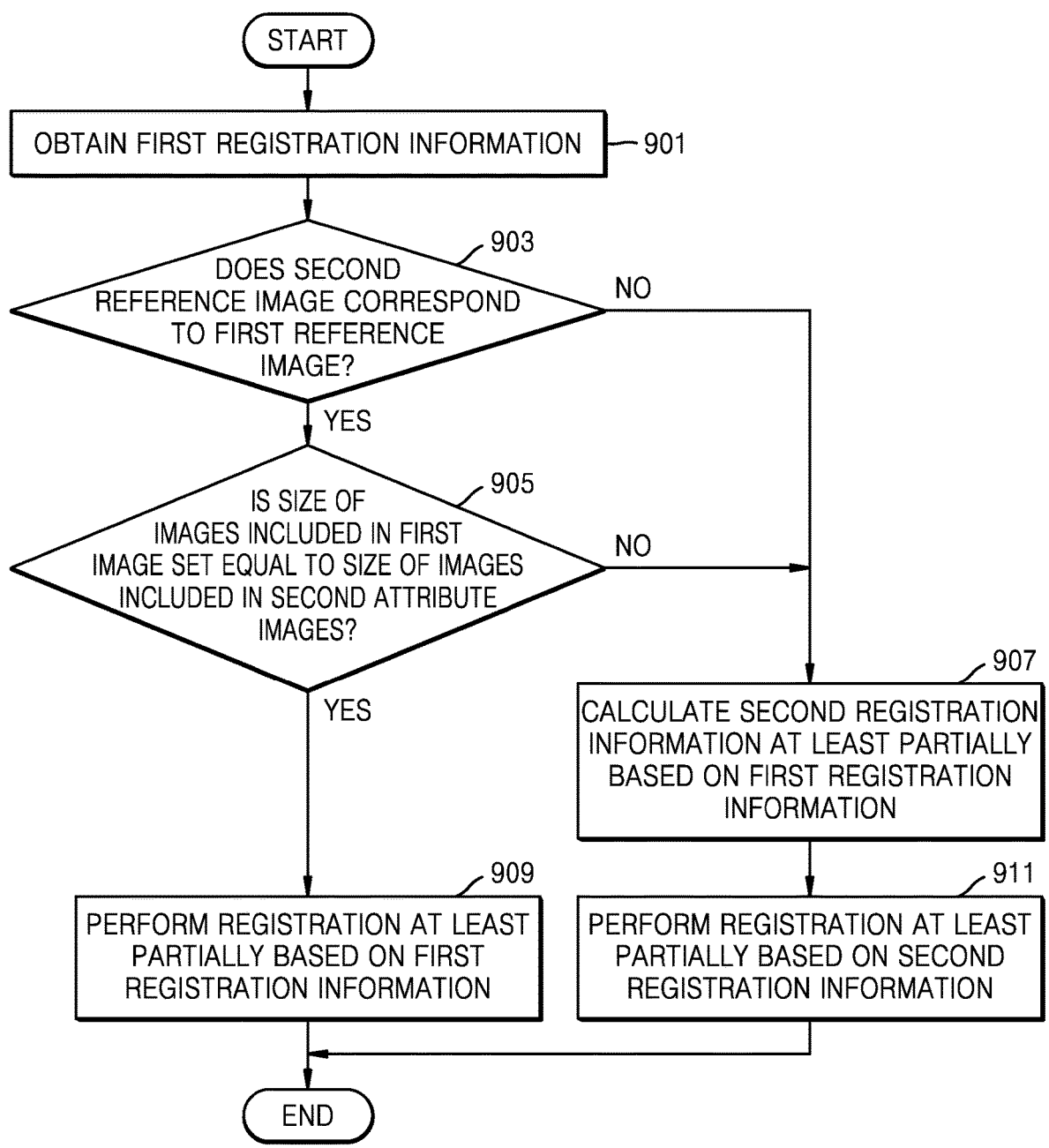
FIGS. 9A and 9B are flowcharts for describing a method of providing an image, according to an example embodiment.
Figure 9B:
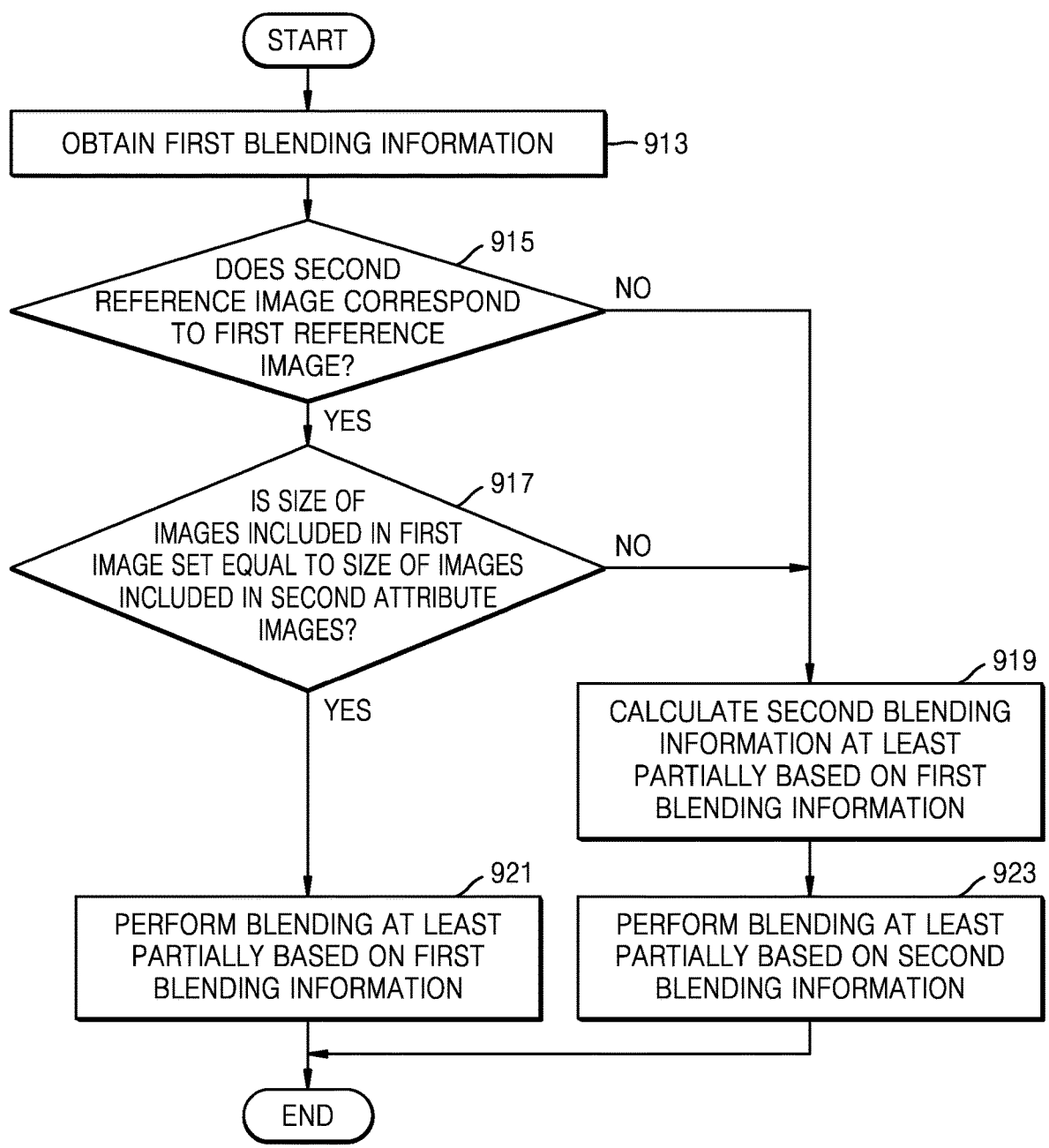

FIGS. 9A and 9B are flowcharts of a method of providing an image, according to the example embodiment described with reference to FIG. 5. FIGS. 9A and 9B are the flowcharts related to an operation of generating at least one second image according to the example embodiment described with reference to FIG. 5 and may include the operation at least partially the same or substantially the same as the operation described in FIG. 5.

Referring to FIGS. 9A, 9B, and 5, in operation 901, the registration controlling portion 539 may obtain first registration information from the first buffer 517.

In operation 903, the registration controlling portion 539 may determine whether the second reference image corresponds to the first reference image.

In operation 905, the registration controlling portion 539 may determine whether a size of the images included in the first image set is equal to a size of images included in the second attribute images.

In operation 907, when it is at least one of: (1) the case in which it is determined in operation 903 that the second reference image does not correspond to the first reference image and (2) the case in which it is determined in operation 905 that the size of the images included in the first image set is not equal to the size of the images included in the second attribute images, the registration controlling portion 539 may calculate the second registration information at least partially based on the first registration information.

According to an embodiment, when the registration controlling portion 539 determines that the second reference image does not correspond to the first reference image, the registration controlling portion 539 may calculate the second registration information by changing the first registration information at least partially based on the second reference image.

According to an embodiment, when the registration controlling portion 539 determines that the size of the images included in the first image set is not equal to the size of the images included in the second attribute images, the registration controlling portion 539 may determine the second registration information by scaling (or resizing) the first registration information.

According to an embodiment, when the registration controlling portion 539 determines that the second reference image does not correspond to the first reference image and the size of the images included in the first image set is not equal to the size of the images included in the second attribute images, the registration controlling portion 539 may determine the second registration information by changing the first registration information at least partially based on the second reference image and then scaling the changed first registration information.

In operation 909, when the registration controlling portion 539 determines in operations 903 and 905 that the second reference image corresponds to the first reference image and the size of the images included in the first image set is equal to the size of the images included in the second attribute images, the second registration performing portion 538 may perform registration at least partially based on the first registration information.

According to an embodiment, the second registration performing portion 538 may register the second attribute images at least partially based on the first registration information and the pre-processed second attribute images.

In operation 911, the second registration performing portion 538 may perform registration at least partially based on the second registration information calculated in operation 907.

According to an embodiment, the second registration performing portion 538 may register the second attribute images at least partially based on the second registration information and the pre-processed second attribute images.

In operation 913, the blending controlling portion 549 may obtain first blending information from the second buffer.

In operation 915, the blending controlling portion 549 may determine whether the second reference image corresponds to the first reference image.

In operation 917, the blending controlling portion 549 may determine whether the size of the images included in the first image set is equal to the size of the images included in the second attribute images.

In operation 919, when it is at least one of: (1) the case in which it is determined in operation 915 that the second reference image does not correspond to the first reference image and (2) the case in which it is determined in operation 917 that the size of the images included in the first image set is not equal to the size of the images included in the second attribute images, the blending controlling portion 549 may calculate the second blending information at least partially based on the first blending information.

According to an embodiment, when the second reference image does not correspond to the first reference image, the blending controlling portion 549 may calculate the second blending information by changing the first blending information to correspond to the second reference image.

According to an embodiment, when the size of the images included in the first image set is not equal to the size of the images included in the second attribute images, the blending controlling portion 549 may calculate weights of the pixels to correspond to the second attribute images by using interpolation.

According to an embodiment, when the second reference image does not correspond to the first reference image and the size of the images included in the first image set is not equal to the size of the images included in the second attribute images, the blending controlling portion 549 may calculate the weights of the pixels to correspond to the second reference image and may apply interpolation to the calculated weights of the pixels to calculate the second blending information.

In operation 921, when the blending controlling portion 549 determines in operations 915 and 917 that the second reference image corresponds to the first reference image and the size of the images included in the first image set is equal to the size of the images included in the second attribute images, the second blending performing portion 545 may perform a blending operation at least partially based on the first blending information.

According to an embodiment, the second blending performing portion 545 may blend the second attribute images at least partially based on the registered second attribute images and the first blending information.

In operation 923, the second blending performing portion 545 may perform the blending operation at least partially based on the second blending information calculated in operation 919.

Figure 10:
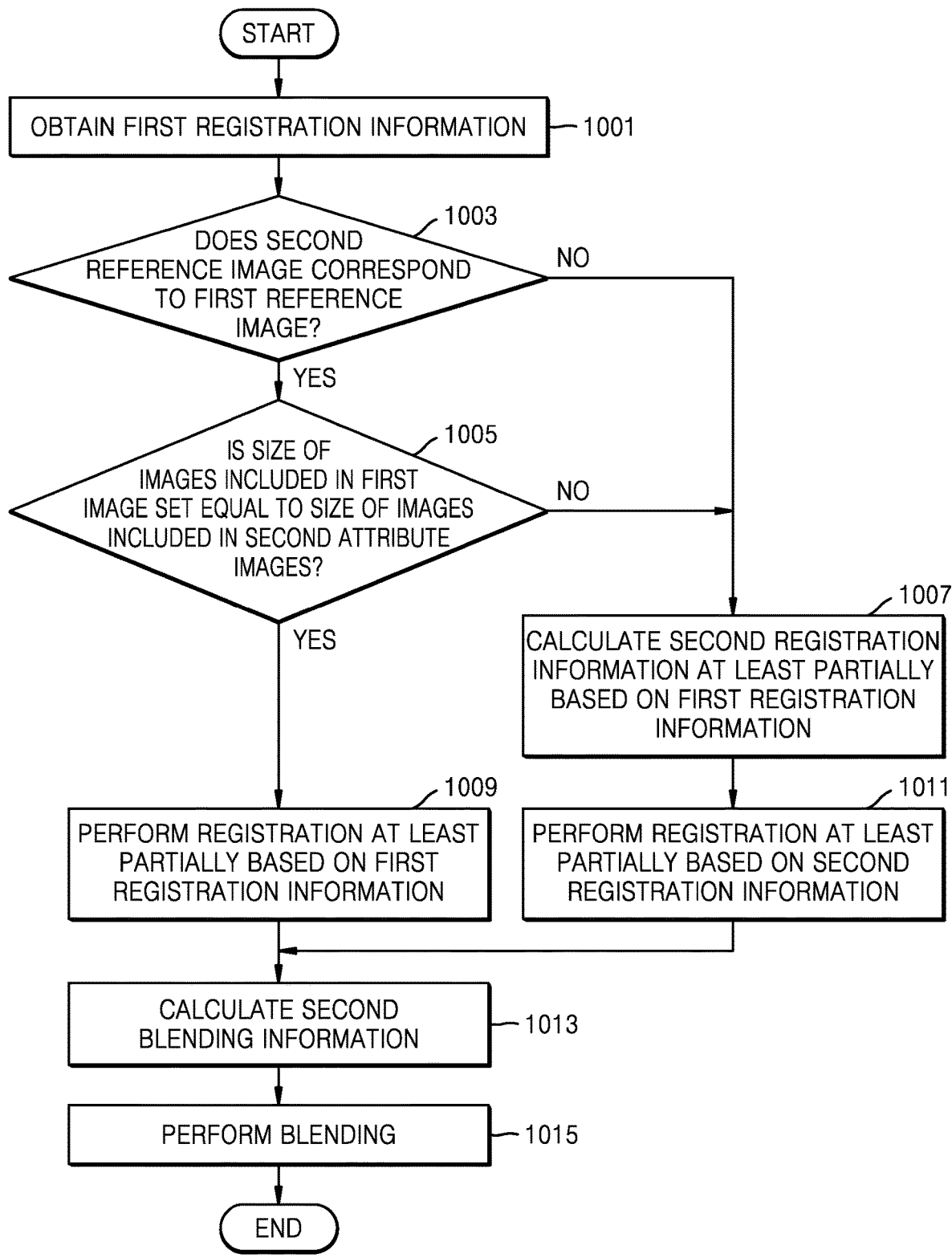
FIG. 10 is a flowchart for describing a method of providing an image, according to an example embodiment.

FIG. 10 is a flowchart of a method of providing an image, according to the example embodiment described with reference to FIG. 6. FIG. 10 is the flowchart related to an operation of generating at least one second image according to the example embodiment described with reference to FIG. 6 and may include the operation at least partially the same or substantially the same as the operation described in FIG. 6.

Operations 1001 to 1011 are at least partially the same or substantially the same as operations 901 through 911, and thus, their detailed descriptions will be omitted.

In operation 1013, the second blending information calculating portion 641 may calculate the second blending information at least partially based on the obtained second registration information and the registered second attribute images.

According to an embodiment, the second blending information calculating portion 641 may calculate the second weight based on the second blending information. According to an embodiment, the second blending information calculating portion 641 may determine the weight of each of the pixels of the images included in the second attribute images at least partially based on the second registration information.

The operation of determining the second weight via the second blending information calculating portion 641 is at least partially the same or substantially the same as the operation of determining the second weight by using Equations 8 to 10 in FIG. 6, and thus, its detailed description will be omitted.

In operation 1015, the second blending performing portion 545 may blend the second attribute images at least partially based on the registered second attribute images and the second blending information. For example, the second blending performing portion 545 may blend the second attribute images at least partially based on values obtained by multiplying values of the pixels of each of the images included in the second attribute images by the weights of the pixels of each of the second attribute images. For example, values of the blended image may correspond to the values obtained by multiplying the values of the pixels of each of the images included in the first image set by the weights of the pixels of each of the images included in the first image set.

Figure 11:
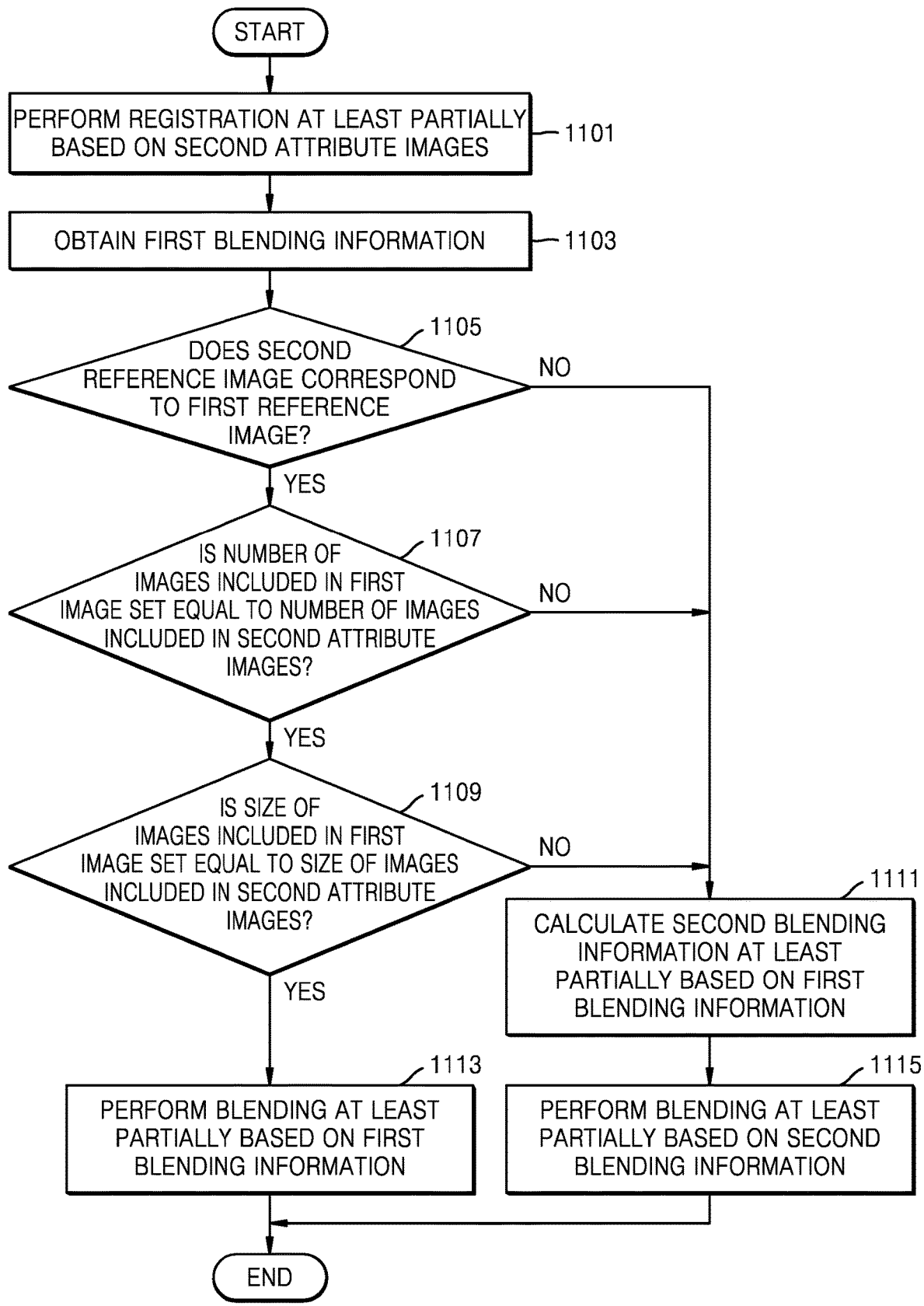
FIG. 11 is a flowchart for describing a method of providing an image, according to an example embodiment.

FIG. 11 is a flowchart of a method of providing an image, according to the example embodiment described with reference to FIG. 7. FIG. 11 is the flowchart related to an operation of generating at least one second image according to the example embodiment described with reference to FIG. 7 and may include at least partially the same or substantially the same operation as the operation described in FIG. 7.

In operation 1101, the second registration portion 730 may register second attribute images at least partially based on the second attribute images obtained from the camera module 180.

In operation 1103, the blending controlling portion 749 may obtain first blending information from the second buffer 723.

In operation 1105, the blending controlling portion 749 may determine whether the second reference image corresponds to the first reference image.

In operation 1107, the blending controlling portion 749 may determine whether the number of images included in the first image set is equal to the number of second attribute images.

In operation 1109, the blending controlling portion 749 may determine whether the size of images included in the first image set is equal to the size of the images included in the second attribute images.

In operation 1111, the blending controlling portion 749 may calculate the second blending information at least partially based on the first blending information.

According to an embodiment, when the second reference image does not correspond to the first reference image, the blending controlling portion 749 may calculate the second blending information by changing the first blending information to correspond to the second reference image.

According to an embodiment, when the number of images included in the first image set is not equal to the number of second attribute images, the blending controlling portion 749 may calculate the second blending information by changing the first blending information to correspond to the number of second attribute images. According to an embodiment, when the size of images included in the first image set is not equal to the size of the images included in the second attribute images, the blending controlling portion 749 may calculate the second blending information by using extrapolation.

According to an embodiment, when the size of the images included in the first image set is not equal to the size of the images included in the second attribute images, the blending controlling portion 749 may calculate the weights of the pixels to correspond to the size of the second attribute images by using interpolation.

According to an embodiment, when the second reference image does not correspond to the first reference image and the size of the images included in the first image set is not equal to the size of the images included in the second attribute images, the blending controlling portion 749 may calculate the second blending information by calculating weights of pixels to correspond to the second reference image and applying interpolation to the calculated weights of the pixels.

According to an embodiment, when the number of images included in the first image set is not equal to the number of second attribute images and the size of the images included in the first image set is not equal to the size of the images included in the second attribute images, the blending controlling portion 749 may calculate the second blending information by applying extrapolation and interpolation with respect to the first weight. According to an embodiment, the blending controlling portion 749 may calculate second blending information by applying interpolation with respect to the calculated weights of the pixels after applying extrapolation with respect to the first weight or by applying extrapolation with respect to the calculated weights of the pixels after applying interpolation with respect to the first weight.

According to an embodiment, when: (1) the second reference image does not correspond to the first reference image, (2) the size of the images included in the first image set is not equal to the size of the images included in the second attribute images, and (3) the number of images included in the first image set is not equal to the number of images included in the second attribute images, the blending controlling portion 749 may calculate the second blending information by calculating the weights of the pixels to correspond to the second reference image and applying extrapolation and interpolation with respect to the calculated weights of the pixels.

According to an embodiment, the blending controlling portion 749 may generate a blending map with respect to each of the second reference image and the second rest image at least partially based on the weights of the pixels of the second reference image and the weights of the pixels of the second rest image.

In operation 1113, when the second reference image corresponds to the first reference image and the size of the images included in the first image set is equal to the size of the images included in the second attribute images, the blending controlling portion 749 may perform a blending operation at least partially based on the first blending information.

According to an embodiment, the second blending performing portion 745 may blend the second attribute images at least partially based on the registered second attribute images and the first blending information.

In operation 1115, the blending controlling portion 549 may perform a blending operation at least partially based on the second blending information calculated in operation 1111.

FIG. 12 illustrates comparative processing times for the related art and an embodiment of the present disclosure.

Referring to FIG. 12, an image processing time of the disclosure, whereby information generated in an operation of generating a moving image is used for an operation of generating a still image, may be less than an image processing time of the related art, whereby information generated in an operation of generating a moving image is not used for an operation of generating a still image. For example, the image processing time (e.g., a blending time of the still image) according to the related art may be 265 msec. and the image processing time according to the disclosure according to the example embodiment described with reference to FIG. 5 may be 210 msec.

According to the method of providing an image and the electronic device for supporting the method according to the embodiments, the information calculated while generating the moving image may be used for generating the still image and, thus, the number of software or hardware resources for generating the still image may be reduced and heating, power consumption, operation time, etc., may be improved.

The method of providing an image according to embodiments may include: (1) obtaining a plurality of images having a first attribute with respect to an external object, by using a camera, (2) generating at least one first image by correcting images included in a first image set, from among the plurality of images, during at least a portion of the obtaining of the plurality of images, (3) displaying the generated at least one first image, (4) obtaining a plurality of images having a second attribute with respect to the external object, based on a received signal corresponding to an image capture about the external object during the at least the portion of the obtaining of the plurality of images, and (5) storing at least one second image generated by correcting the plurality of images having the second attribute based on the first image set.

According to embodiments, the generating of the at least one first image may include registering the at least one first image, from among the images included in the first image set, at least partially based on comparison of the at least one first image with a first reference image, from among the images included in the first image set, and generating the at least one first image that is corrected by blending the registered at least one image with the first reference image.

According to embodiments, the registering of the at least one first image may include determining first registration information for registering the at least one first image. Generating the at least one first image may include determining first blending information for blending the registered at least one first image with the first reference image.

According to embodiments, the storing of the at least one second image may include: (1) registering the at least one second image, from among the plurality of images having the second attribute, at least partially based on comparison of the at least one second image with a second reference image from among the plurality of images having the second attribute and (2) generating the at least one second image that is corrected by blending the registered at least one second image with the second reference image.

According to embodiments, the registering of the at least one second image may include determining second registration information for registering the at least one second image at least partially based on the first registration information.

According to embodiments, the registering of the at least one second image may include performing at least one of: (1) an operation of changing the first registration information to correspond to the second reference image when the second reference image does not correspond to the first reference image and (2) an operation of scaling the first registration information when a size of each of the images included in the first image set is not equal to a size of each of the plurality of images having the second attribute.

According to embodiment, the blending of the registered at least one second image with the second reference image may include determining second blending information for blending the registered at least one second image with the second reference image at least partially based on the first blending information.

According to embodiments, the determining of the second blending information may include: (1) determining the second blending information by performing at least one of an operation of changing the first blending information such that the first blending information corresponds to the second reference image when the second reference image does not correspond to the first reference image, (2) an operation of applying extrapolation when the number of images having the second attribute is greater than the number of images included in the first image set, and (3) an operation of applying interpolation when a size of each of the images included in the first image set is less than a size of each of the plurality of images having the second attribute.

According to embodiments, the displaying of the generated at least one first image may include displaying the generated at least one first image as a preview image.

According to embodiments, a size of each of the images included in the first image set may not be equal to a size of each of the plurality of images having the second attribute.

Also, structures of data used in the embodiments described above may be recorded to a computer-readable recording medium via various means. The computer-readable recording medium may include storage media, such as magnetic storage media (for example, ROM, floppy disk, hard disk, etc.) and optical reading media (for example, CD-ROM, DVD, etc.).

According to an embodiment, the computer-readable recording medium may record a program to execute via an electronic device: (1) an operation of obtaining a plurality of images having a first attribute with respect to an external object, by using a camera, (2) an operation of generating at least one first image by correcting images included in a first image set from among the plurality of images, during at least a portion of the obtaining of the plurality of images, (3) an operation of displaying the generated at least one first image, (4) an operation of obtaining a plurality of images having a second attribute with respect to the external object, based on a received signal corresponding to an image capture about the external object, during the at least the portion of the obtaining of the plurality of images, and (5) an operation of storing at least one second image generated by correcting the plurality of images having the second attribute based on the first image set.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been particularly shown and described with reference to embodiments thereof, it will be understood that various changes in form and details may be made therein without departing from the spirit and scope of the following claims.

What is claimed is:

1. An electronic device comprising:
a camera;
a memory; and
a processor that:
    obtains, with assistance of the camera, a first plurality of images having a first attribute with respect to an external object,
    registers a third image in an image set among the first plurality of images as a registered third image using first registration information that is based on a comparison of the third image with a first reference image included in the image set,
    generates a first image using first blending information obtained by blending the registered third image with the first reference image,
    displays the first image,
    obtains, while obtaining the first plurality of images and based on a received signal corresponding to an image capture of the external object, a second plurality of images having a second attribute with respect to the external object,
    registers a fourth image among the second plurality of images as a registered fourth image based on a comparison of the fourth image with a second reference image among the second plurality of images,
    generates a second image by blending the registered fourth image with the second reference image, and
    stores the second image in the memory, wherein
the processor determines, based on the first registration information, second registration information for registering the fourth image.

2. The electronic device of claim 1, wherein the processor:
changes the first registration information to correspond to the second reference image, when the second reference image does not correspond to the first reference image, or
scales the first registration information when a size of each of fifth images included in the first image set is not equal to a size of each of sixth images included in the second plurality of images.

3. The electronic device of claim 1, wherein the processor determines, based on the first blending information, second blending information for blending the registered fourth image with the second reference image.

4. The electronic device of claim 3, wherein the processor:
changes the first blending information to correspond to the second reference image, when the second reference image does not correspond to the first reference image,
applies extrapolation when a number of sixth images having the second attribute is greater than a number of fifth images included in the first image set, or
applies interpolation when a size of each of the fifth images included in the first image set is less than a size of each of the sixth images included in the second plurality of images.

5. The electronic device of claim 1, wherein the processor displays the first image as a preview image.

6. The electronic device of claim 1, wherein a size of each of fifth images included in the first image set is not equal to a size of each of sixth images included in the second plurality of images.

7. A method of providing an image, the method comprising:
- obtaining, with assistance of a camera, a first plurality of images having a first attribute with respect to an external object;
- registering a third image in an image set among the first plurality of images as a registered third image using first registration information that is based on a comparison of the third image with a first reference image included in the image set;
- generating a first image using first blending information obtained by blending the registered third image with the first reference image;
- displaying the first image;
- obtaining, while obtaining the first plurality of images and based on a received signal corresponding to an image capture of the external object, a second plurality of images having a second attribute with respect to the external object;
- registering a fourth image among the second plurality of images as a registered fourth image based on a comparison of the fourth image with a second reference image among the second plurality of images;
- generating a second image by blending the registered fourth image with the second reference image; and
- storing the second image in a memory, wherein registering the fourth image comprises determining, based on the first registration information, second registration information for registering the fourth image.

8. The method of claim 7, further comprising:
- changing the first registration information to correspond to the second reference image, when the second reference image does not correspond to the first reference image, or
- scaling the first registration information when a size of each of fifth images included in the first image set is not equal to a size of each of sixth images included in the second plurality of images.

9. The method of claim 7, further comprising determining, based on the first blending information, second blending information for blending the registered fourth image with the second reference image.

10. The method of claim 9, further comprising:
- changing the first blending information to correspond to the second reference image, when the second reference image does not correspond to the first reference image,
- applying extrapolation when a number of the second plurality of images is greater than a number of fifth images included in the first image set, or
- applying interpolation when a size of each of the fifth images included in the first image set is less than a size of each of sixth images included in the second plurality of images.

11. The method of claim 7, further comprising displaying the first image as a preview image.

12. The method of claim 7, wherein a size of each of fifth images included in the first image set is not equal to a size of each of sixth images included in the second plurality of images.

* * * * *